(12) United States Patent
Okamoto

(10) Patent No.: US 9,023,932 B2
(45) Date of Patent: May 5, 2015

(54) CURABLE COMPOSITION

(75) Inventor: Toshihiko Okamoto, Takasago (JP)

(73) Assignee: Kaneka Corporation, Osaka (JP)

( * ) Notice: Subject to any disclaimer, the term of this patent is extended or adjusted under 35 U.S.C. 154(b) by 75 days.

(21) Appl. No.: 13/574,108

(22) PCT Filed: Jan. 18, 2011

(86) PCT No.: PCT/JP2011/000217
§ 371 (c)(1),
(2), (4) Date: Sep. 19, 2012

(87) PCT Pub. No.: WO2011/089878
PCT Pub. Date: Jul. 28, 2011

(65) Prior Publication Data
US 2013/0023617 A1  Jan. 24, 2013

(30) Foreign Application Priority Data

Jan. 19, 2010 (JP) ................................. 2010-009092
Jan. 6, 2011 (JP) ................................. 2011-001341

(51) Int. Cl.
| C08K 5/57 | (2006.01) |
| C08K 5/544 | (2006.01) |
| C08L 101/10 | (2006.01) |
| C08G 65/336 | (2006.01) |
| C08K 5/5415 | (2006.01) |
| C08K 3/26 | (2006.01) |

(52) U.S. Cl.
CPC ............. C08K 5/5415 (2013.01); C08K 5/544 (2013.01); C08K 5/57 (2013.01); C08K 3/26 (2013.01)

(58) Field of Classification Search
CPC .......... C08K 5/57; C08K 5/5415; C08K 3/26; C08G 65/336; C08L 2312/08; C08L 101/10
See application file for complete search history.

(56) References Cited

U.S. PATENT DOCUMENTS 5,218,015 A * 6/1993 Yasuda et al. ................. 523/210
6,552,118 B2 4/2003 Fujita et al.
2003/0096904 A1 5/2003 Hakuta et al.
2004/0210019 A1 * 10/2004 Hasegawa et al. ............ 526/279
2005/0276934 A1 * 12/2005 Fukui et al. ................... 428/32.6
2009/0264602 A1 * 10/2009 Mori et al. ..................... 525/431
2012/0088859 A1 4/2012 Kotani et al.

FOREIGN PATENT DOCUMENTS

| CN | 100480324 C | 4/2009 |
| EP | 1464675 A2 * | 10/2004 |
| JP | 52-073998 A | 6/1977 |
| JP | 52-73998 A | 6/1977 |
| JP | 07-011155 A | 1/1995 |
| JP | 11-130931 A | 5/1999 |
| JP | 2001172515 A * | 6/2001 |
| JP | 2010-111745 A | 5/2010 |
| WO | 2009/071876 A1 | 6/2009 |
| WO | 2010/070894 A1 | 6/2010 |
| WO | 2010/150361 A1 | 12/2010 |

OTHER PUBLICATIONS

Derwent Abstract of JP 2001-172515 (Jun. 2001).*
CAPlus Abstract of JP 2001-172515 (Jun. 2001).*
Machine translated English equivalent of JP 2001-172515 (Jun. 2001).*
International Search Report of PCT/JP2011/000217, mailing date Mar. 29, 2011.
International Preliminary Report on Patentability (Form PCT/IB/373) of International Application No. PCT/JP2011/000217 dated Aug. 7, 2012, with Form PCT/ISA/237.

* cited by examiner

*Primary Examiner* — Brieann R Fink
(74) *Attorney, Agent, or Firm* — Westerman, Hattori, Daniels & Adrian, LLP

(57) ABSTRACT

The present invention aims to provide a curable composition that, while having practical curability, gives a cured product with excellent recovery, and exhibits excellent curability as well as excellent water-resistant adhesion. The curable composition includes 100 parts by weight of a reactive silyl group-containing organic polymer (A); 0.1 to 10 parts by weight of a dialkyltin disilicate compound (B); and an amino silane coupling agent (C), the dialkyltin disilicate compound (B) being a tin compound containing a bulky alkyl group and a silicate moiety with a C1 or C2 alkoxy group, and the amino silane coupling agent (C) including 1 to 10 parts by weight of an amino silane coupling agent (C1) containing a trialkoxysilyl group, and less than 1 part by weight of an amino silane coupling agent (C2) containing a dialkoxysilyl or monoalkoxysilyl group.

11 Claims, No Drawings

CURABLE COMPOSITION

TECHNICAL FIELD

The present invention relates to a curable composition comprising one or more organic polymers containing a silicon-containing group which contains a hydroxy or hydrolyzable group bonded to a silicon atom and can form a siloxane bond to be cross-linked (hereinafter referred to also as a "reactive silyl group").

BACKGROUND ART

An organic polymer containing at least one reactive silyl group in a molecule is known to have a characteristic that it is cross-linked by siloxane bond formation involving hydrolysis or other reactions of the reactive silyl group due to factors such as moisture even at room temperature, and thereby a rubbery cured product is obtained.

Among such reactive silyl group-containing polymers, organic polymers with a main chain skeleton of a polyoxyalkylene polymer or a polyacrylate ester polymer are described in documents such as Patent Literature 1 and Patent Literature 2, and have already been industrially produced and widely used in applications such as sealing materials, adhesives, and coating materials.

Curable compositions containing these reactive silyl group-containing organic polymers are cured by means of a silanol condensation catalyst, and in the case of one-pack curable compositions, organotin catalysts having carbon-tin bonds, such as dibutyltin bis(acetylacetonate), are widely used. However, conventional organotin catalysts bring problems of low recovery and low creep resistance to the curable composition.

Patent Literature 3 describes a technique of improving water-resistant adhesion using a curable composition that contains as an organotin curing catalyst an organotin compound having a specific structure.

CITATION LIST

Patent Literature

Patent Literature 1: JP-AS52-73998
Patent Literature 2: JP-AH11-130931 (U.S. Pat. No. 6,552,118)
Patent Literature 3: JP-AH07-11155

SUMMARY OF INVENTION

Technical Problem

However, the use of the organotin compound described in Patent Literature 3 still leads to low recovery, and thus the recovery has been desired to be increased.

Curable compositions using the organotin compound of Patent Literature 3 also have a problem that the water-resistant adhesion may be insufficient depending on its structure.

The present invention aims to provide a curable composition mainly containing a reactive silyl group-containing organic polymer, which, while having practical curability, exhibits favorable recovery and favorable curability as well as favorable water-resistant adhesion, by using an organotin compound.

Solution to Problem

The present inventor has first studied the cause of the low recovery of the cured product obtained by curing a conventional curable composition containing an organotin compound. As described above, the curable composition is cross-linked by forming a siloxane bond between terminal reactive silyl groups of the polymers to give a rubbery cured product. Here, the present inventor has assumed that cleavage of siloxane bonds at cross-linking points can be accelerated by the organotin compound functioning as a catalyst. As a result of eager studies based on such an assumption, the present inventor has found that the use of a dialkyltin compound carrying a three-dimensionally bulkier alkyl group in place of a conventional dibutyltin compound generally used as a silanol condensation catalyst for a reactive silyl group-containing organic polymer can suppress cleavage of siloxane bonds in the cured product, and thus a curable composition achieving favorable recovery is obtained.

Conventional dialkyltin compounds generally used include compounds containing two groups bonded to a tin atom via a carbon-oxygen-tin bond, such as an alkoxy group or an acyloxy group, in addition to two alkyl groups directly bonded to a tin atom via a carbon-tin bond. Specifically, these compounds include, for example, dialkyltin dialkoxides, dialkyltin dicarboxylates, and dialkyltin bisacetylacetonates. The present inventor has found that replacing these two groups bonded to a tin atom via an oxygen atom in such a dialkyltin compound with siloxy groups bonded to a tin atom via a silicon-oxygen-tin bond leads to a curable composition achieving better recovery, although the cause thereof is not clear. Such siloxy group-containing dialkyltin compounds include, for example, dialkyltin disilicate compounds obtainable by reacting a dialkyltin dicarboxylate and a tetraalkoxysilane and/or its partially hydrolyzed condensate. As mentioned above, dialkyltin disilicate compounds containing bulky alkyl groups and the siloxy groups have been found to produce cured products that exhibit particularly high recovery among the conventionally known organotin compounds.

Furthermore, the present inventor has found that the water-resistant adhesion is insufficient unless a silicate moiety carrying a C1 or C2 alkoxy group is used as the silicate moiety of the dialkyltin disilicate compound.

Also, the present inventor has found that highly practical, favorable curability observed with the dialkyltin disilicate compound results from combination use with an aminosilane coupling agent. Particularly, the combination use with an amino silane coupling agent containing a primary amino group has been found to achieve a higher recovery ratio. Although compounds having various structures are commercially available as the amino silane coupling agents, the favorable recovery as above has been found to be achieved only in the case that the aminosilane coupling agent containing a trialkoxysilyl group and the dialkyltin disilicate compound are used in combination. Addition of a certain amount or more of an amino silane coupling agent containing a dialkoxysilyl group or monoalkoxysilyl group greatly decreases the recovery.

The present inventor has thus made intensive studies to solve the above problems, and has found that a curable composition, having both highly practical curability and favorable recovery and at the same time exhibiting favorable water-resistant adhesion, can be obtained in the case that a combination of a dialkyltin disilicate compound, containing a bulky alkyl group and a silicate moiety with a C1 or C2 alkoxyl group, and a trialkoxy silane coupling agent containing a primary amino group is used as the silanol condensation catalyst for the curable composition including a reactive silyl group-containing organic polymer. Based on the findings, the present invention has been completed.

That is, the present invention is directed to a curable composition comprising:

100 parts by weight of an organic polymer (A) containing at least one silyl group that contains a hydroxy or hydrolyzable group bonded to a silicon atom and can form a siloxane bond to be cross-linked;

0.1 to 10 parts by weight of a silanol condensation catalyst (B); and a silane coupling agent (C) that contains a primary amino group, the silanol condensation catalyst (B) being a reaction product of a dialkyltin dicarboxylate represented by the following formula (1) and a tetraalkoxysilane represented by the following formula (2) and/or its partially hydrolyzed condensate, the formula (1) being $$R^1{}_2Sn(OCOR^2)_2 \quad (1)$$

wherein two $R^1$s each independently are a C5 to C17 monovalent hydrocarbon group, and two $R^2$s each independently are a C1 to C17 monovalent hydrocarbon group, the formula (2) being $$Si(OR^3)_4 \quad (2)$$

wherein four $R^3$s each independently are a C1 or C2 hydrocarbon group, the silane coupling agent (C) that contains a primary amino group being an amino silane coupling agent that contains an —$NH_2$ group and a group represented by formula (3):

$$-SiR^4{}_{3-b}(OR^5)_b \quad (3)$$

wherein 3–b $R^4$s each independently are a C1 to C20 hydrocarbon group, b $R^5$s each independently are a C1 or C2 hydrocarbon group, and b is 1, 2, or 3, and the curable composition having a content of an amino silane coupling agent (C1) with b in formula (3) being 3 of 1 to 10 parts by weight, and having a content of an amino silane coupling agent (C2) with b in formula (3) being 1 or 2 of less than 1 part by weight.

The silanol condensation catalyst (B) is preferably a dialkyltin disilicate compound represented by formula (4):

$$R^1{}_2Sn\{OSi(OR^3)_3\}_2 \quad (4)$$

wherein two $R^1$s each independently are a C5 to C17 monovalent hydrocarbon group, and six $R^3$s each independently are a C1 or C2 hydrocarbon group.

The organic polymer (A) preferably has a main chain skeleton of a polyoxyalkylene polymer and/or a poly(meth)acrylate ester polymer.

The organic polymer (A) preferably has a main chain skeleton of a polyoxypropylene polymer.

The silyl group in the organic polymer (A) is preferably a group represented by formula (5):

$$-SiR^6{}_{3-a}(OR^7)_a \quad (5)$$

wherein 3–a $R^6$s each independently are a C1 to C20 alkyl group, a C6 to C20 aryl group, a C7 to C20 aralkyl group, or a triorganosiloxy group represented by $(R')_3SiO—$ with R's each independently being a substituted or unsubstituted C1 to C20 hydrocarbon group; a $R^7$s each independently are a C1 or C2 hydrocarbon group; and a is 1, 2, or 3.

The silanol condensation catalyst (B) is preferably a reaction product obtained by reacting 1 mole of the dialkyltin dicarboxylate represented by formula (1) and 2 to 6 moles of the tetraalkoxysilane represented by formula (2) and/or its partially hydrolyzed condensate, or a mixture of the reaction product and the tetraalkoxysilane represented by formula (2) and/or its partially hydrolyzed condensate.

$R^7$ in the component (A) and $R^5$ in the component (C) are preferably the same groups.

Preferably, the curable composition further comprises a silicon compound (D) represented by formula (6):

$$R^8{}_{4-c}Si(OR^9)_c \quad (6)$$

wherein 4–c $R^8$s each independently are an unsubstituted C1 to C20 hydrocarbon group or a substituted C1 to C20 hydrocarbon group with a substituent other than an amino group, c $R^9$s each independently are a C1 or C2 hydrocarbon group, and c is 1, 2, 3, or 4, and the curable composition having a content of a silicon compound (D1) with c in formula (6) being 3 or 4 of 1 to 10 parts by weight, and having a content of a silicon compound (D2) with c in formula (6) being 1 or 2 of less than 1 part by weight.

$R^7$ in the component (A), $R^5$ in the component (C), and $R^9$ in the component (D) are preferably the same groups.

According to a preferred embodiment, the curable composition is a one-pack curable composition.

The curable composition preferably further comprises colloidal calcium carbonate.

The curable composition preferably comprises 1 to 300 parts by weight of the colloidal calcium carbonate for each 100 parts by weight of the component (A).

The curable composition preferably comprises not more than 180 parts by weight of heavy calcium carbonate for each 100 parts by weight of the component (A).

Advantageous Effects of Invention

The curable composition of the present invention, while having practical curability, gives a cured product with excellent recovery, and also exhibits excellent curability after storage.

DESCRIPTION OF EMBODIMENTS

Hereinafter, the present invention will be described in detail.

The main chain skeleton of the reactive silyl group-containing organic polymer used in the present invention is not particularly limited, and polymers with various main chain skeletons can be used.

Specific examples thereof include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as ethylene-propylene copolymers, polyisobutylene, copolymers of isobutylene and isoprene or a like monomer, polychloroprene, polyisoprene, copolymers of isoprene or butadiene with acrylonitrile and/or styrene or a like monomer, polybutadiene, and copolymers of isoprene or butadiene with acrylonitrile and styrene or a like monomer, and hydrogenated polyolefin polymers derived from hydrogenation of these polyolefin polymers; polyester polymers obtained by condensation of a dibasic acid such as adipic acid and a glycol, and obtained by ring-opening polymerization of lactones; (meth)acrylate ester polymers obtained by radical polymerization of monomers such as ethyl(meth)acrylate and butyl(meth)acrylate; vinyl polymers obtained by radical polymerization of monomers such as (meth)acrylate ester monomers, vinyl acetate, acrylonitrile, and styrene; graft polymers obtained by polymerizing vinyl monomers in these organic polymers; polysulfide polymers; polyamide polymers such as nylon 6 produced by ring-opening polymerization of ε-caprolactam, nylon 6/6 produced by polycondensation of hexamethylenediamine and adipic acid, nylon 6/10 produced by polycondensation of hexamethylenediamine and sebacic acid, nylon 11 produced by polycondensation of ε-aminoundecanoic acid, nylon 12 produced by ring-opening polymerization of ε-aminolaurolactam, and copolymer nylons containing multiple species of the aforementioned nylons; polycarbonate polymers produced by, for example, polycondensation of bisphenol A and carbonyl chloride; and diallyl phthalate polymers. Preferred among these are saturated hydrocarbon polymers such as polyisobutylene, hydrogenated polyisoprene, and hydrogenated polybutadiene; polyoxyalkylene polymers; and (meth)acrylate ester polymers. This is because these polymers have a relatively low glass transition temperature, and give cured products that are excellent in cold resistance.

The glass transition temperature of the organic polymer (A) is not particularly limited, but is preferably 20° C. or lower, more preferably 0° C. or lower, and particularly preferably −20° C. or lower. A glass transition temperature of higher than 20° C. may lead to the composition with high viscosity in winter or in cold districts, and therefore with lower workability, and may also result in the cured product with lower flexibility and therefore lower elongation property. The glass transition temperature values are measured by a DSC.

Polyoxyalkylene polymers and (meth)acrylate ester polymers are particularly preferred because they are excellent in moisture permeability, the depth curability when they are used for one-pack compositions, and adhesion property. Here, polyoxyalkylene polymers are most preferred.

The reactive silyl group in the reactive silyl group-containing organic polymer is a group that contains a hydroxy or hydrolyzable group bonded to a silicon atom and can form a siloxane bond to be cross-linked through a reaction accelerated by a silanol condensation catalyst.

The reactive silyl group may be a group represented by formula (7):

wherein 3−a R$^6$s each independently are a C1 to C20 alkyl group, a C6 to C20 aryl group, a C7 to C20 aralkyl group, or a triorganosiloxy group represented by (R')$_3$SiO— with R's each independently being a substituted or unsubstituted C1 to C20 hydrocarbon group; a Xs each independently are a hydroxy or hydrolyzable group; and a is 1, 2, or 3.

The hydrolyzable group is not particularly limited, and may be a conventionally known hydrolyzable group. Specific examples thereof include a hydrogen atom, a halogen atom, an alkoxy group, an acyloxy group, a ketoxymate group, an amino group, an amido group, an acid amido group, an aminooxy group, a mercapto group, and an alkenyloxy group. Preferred among these are a hydrogen atom, an alkoxy group, an acyloxy group, a ketoxymate group, an amino group, an amido group, an aminooxy group, a mercapto group, and an alkenyloxy group. Particularly preferred is an alkoxy group in terms of mild hydrolysis and easy workability.

That is, groups represented by the following formula (5) are preferred in terms of mild hydrolysis and easy workability:

wherein 3−a R$^6$s each independently are a C1 to C20 alkyl group, a C6 to C20 aryl group, a C7 to C20 aralkyl group, or a triorganosiloxy group represented by (R')$_3$SiO— with R's each independently being a substituted or unsubstituted C1 to C20 hydrocarbon group; a R$^7$s each independently are a C1 or C2 hydrocarbon group; and a is 1, 2, or 3.

One to three hydrolyzable or hydroxy groups can be bonded to one silicon atom, and the number of groups is preferably two or three in terms of curability. In the case that two or more hydrolyzable or hydroxy groups are bonded to a silicon atom, these groups may be the same as or different from each other. A reactive silyl group containing three hydroxy or hydrolyzable groups on a silicon atom is preferred in terms of having high activity to achieve favorable curability, and leading to a cured product with excellent recovery, durability, and creep resistance. That is, the value of a in formula (7) and formula (5) is preferably 2 or 3, and is more preferably 3, in terms of curability and recovery. Meanwhile, a reactive silyl group containing two hydroxy or hydrolyzable groups on a silicon atom is preferred in terms of having excellent storage stability, and leading to a cured product with high elongation and high strength. That is, the value of a in formula (7) and formula (5) is preferably 2 in terms of storage stability and the properties of the cured product.

Specific examples of R$^6$ in formula (7) and formula (5) include alkyl groups such as a methyl group and an ethyl group; cycloalkyl groups such as a cyclohexyl group; aryl groups such as a phenyl group; aralkyl groups such as a benzyl group; and triorganosiloxy groups represented by (R')$_3$ SiO— with R's each being a group such as a methyl group and a phenyl group. Among these, a methyl group is particularly preferred.

Specific examples of the reactive silyl group include a trimethoxysilyl group, a triethoxysilyl group, a triisopropoxysilyl group, a dimethoxymethylsilyl group, a diethoxymethylsilyl group, and a diisopropoxymethylsilyl group. Preferred are a trimethoxysilyl group, a triethoxysilyl group, and a dimethoxymethylsilyl group as they have high activity to achieve favorable curability. Particularly preferred is a trimethoxysilyl group. Also, a dimethoxymethylsilyl group is particularly preferred in terms of storage stability. In addition, a triethoxysilyl group and a diethoxymethylsilyl group are particularly preferred because they produce ethanol as alcohol generated in connection with the hydrolysis reaction of the reactive silyl group, which means they have higher safety.

The reactive silyl group may be introduced by a conventionally known method. Some examples thereof are listed below.

(i) An organic polymer containing a functional group such as a hydroxy group in a molecule is allowed to react with an organic compound containing an unsaturated group and an active group that is reactive with the functional group to provide an unsaturated group-containing organic polymer. Alternatively, the functional group-containing organic polymer is allowed to copolymerize with an unsaturated group-containing epoxy compound to provide an unsaturated group-containing organic polymer. Then, the reaction product is allowed to react with a reactive silyl group-containing hydrosilane for hydrosilylation.

(ii) An unsaturated group-containing organic polymer obtained in the same manner as in the method (i) is allowed to react with a compound containing a mercapto group and a reactive silyl group.

(iii) An organic polymer containing a functional group such as a hydroxy group, an epoxy group, or an isocyanato group in a molecule is allowed to react with a compound containing a reactive silyl group and a functional group that is reactive with the former functional group.

Preferred among these is the method (i) or the method (iii) in such a mode that a hydroxy-terminated polymer is allowed to react with a compound containing an isocyanato group and a reactive silyl group because these methods achieve a high conversion rate in a relatively short period of time. Particularly preferred is the method (i) because the curable composition containing the reactive silyl group-containing organic polymer produced by the method (i) has lower viscosity than that in the case of the organic polymer produced by the method (iii), and thus has better workability, and also because the organic polymer produced by the method (ii) has a strong odor due to mercaptosilane.

Specific examples of the hydrosilane compound used in the method (i) include, but not limited to, halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane, and 1-[2-(trimethoxysilyl)ethyl]-1,1,3,3-tetramethyldisiloxane; acyloxysilanes such as methyldiacetoxysilane and phenyldiacetoxysilane; and ketoxymatesilanes such as bis(dimethylketoxymate)methylsilane and bis(cyclohexylketoxymate)methylsilane. Among these, in particular, halogenated silanes and alkoxysilanes are preferred. Most preferred are, in particular, alkoxysilanes because a curable composition to be provided therefrom is mildly hydrolyzed and is easy to handle. Particularly preferred among the alkoxysilanes is methyldimethoxysilane because it is easily available and gives high curability, storage stability, elongation property, and tensile strength to the curable composition containing an organic polymer to be provided. In terms of the curability of the curable composition to be provided and the recovery, trimethoxysilane is particularly preferred.

The synthesis method (ii) is not particularly limited. Examples thereof include a method of introducing a compound containing a mercapto group and a reactive silyl group into an unsaturated-bond moiety of an organic polymer by radical addition reaction in the presence of a radical initiator and/or a radical generation source. Specific examples of the compound containing a mercapto group and a reactive silyl group include, but not limited to, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane.

The synthesis method (iii) in which a hydroxy-terminated polymer is allowed to react with a compound containing an isocyanato group and a reactive silyl group is not particularly limited. Examples thereof include a method as disclosed in JP-A H03-47825. Specific examples of the compound containing an isocyanato group and a reactive silyl group include, but not limited to, γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethoxymethylsilane.

In the case of a silane compound in which three hydrolyzable groups are bonded to one silicon atom, such as trimethoxysilane, disproportionation may proceed. As the disproportionation proceeds, considerably dangerous compounds such as dimethoxysilane and tetrahydrosilane may be generated. In the case of γ-mercaptopropyltrimethoxysilane or γ-isocyanatopropyltrimethoxysilane, however, such disproportionation will not proceed. Thus, the synthesis method (ii) or (iii) is preferred in the case that a group in which three hydrolyzable groups are bonded to one silicon atom, such as a trimethoxysilyl group, is used as the silyl group.

Meanwhile, the disproportionation will not proceed in the case of a silane compound represented by formula (8):

$$H-(SiR^{10}_2O)_m SiR^{10}_2-R^{11}-SiX_3 \quad (8)$$

wherein X is defined as mentioned above; (2×m+2) $R^{10}$s each independently are a hydrocarbon group or a triorganosiloxy group represented by —OSi(R″)$_3$ with R″s each independently being a substituted or unsubstituted C1 to C20 hydrocarbon group, and in terms of availability and cost, $R^{10}$s each are preferably a C1 to C20 hydrocarbon group, more preferably a C1 to C8 hydrocarbon group, and particularly preferably a C1 to C4 hydrocarbon group; $R^{11}$ is a divalent organic group, and is preferably a C1 to C12 divalent hydrocarbon group, more preferably a C2 to C8 divalent hydrocarbon group, and particularly preferably a C2 divalent hydrocarbon group, in terms of availability and cost; and m is an integer of 0 to 19, and is preferably 1 in terms of availability and cost. For this reason, the silane compound represented by formula (8) is preferably used in the case of introducing a group in which three hydrolyzable groups are bonded to one silicon atom by the synthesis method (i). Specific examples of the silane compound represented by formula (8) include 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

The reactive silyl group-containing organic polymer may have a linear or branched structure. The number average molecular weight thereof is about 500 to 100,000, more preferably 1,000 to 50,000, and particularly preferably 3,000 to 30,000 as determined by GPC and expressed on the polystyrene equivalent basis. If the number average molecular weight is lower than 500, the cured product to be provided is likely to be poor in elongation property. If it is higher than 100,000, the curable composition to be provided is likely to have high viscosity and be poor in workability.

The organic polymer may suitably contain, on average, at least one, preferably 1.1 to 5, more preferably 1.3 to 4, and still more preferably 1.5 to 3 reactive silyl groups per polymer molecule for providing a rubbery cured product with high strength, high elongation, and low elastic modulus. If the polymer contains, on average, less than one reactive silyl group per molecule, the curability may be insufficient, which makes it difficult to provide a favorable rubber elastic behavior. The reactive silyl group may be located at a main chain terminal, or at a side chain terminal, or at both terminals, of the organic polymer chain. Particularly in the case that the reactive silyl group is located at a main chain terminal of the molecular chain, the organic polymer component in the resulting cured product has an increased effective network size. Thus, a rubbery cured product having higher strength, higher elongation, and lower elastic modulus tends to be obtained.

The polyoxyalkylene polymers mentioned above are essentially polymers having a repeating unit represented by formula (9):

$$-R^{12}-O- \quad (9)$$

wherein $R^{12}$ is a C1 to C14 linear or branched alkylene group. $R^{12}$ in formula (9) is preferably a C1 to C14, and more preferably C2 to C4, linear or branched alkylene group. Specific examples of the repeating unit represented by formula (9) include —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, and —CH$_2$CH$_2$CH$_2$CH$_2$O—. The main chain skeleton of the polyoxyalkylene polymer may have one kind of repeating unit, or two or more kinds of repeating units. Particularly in applications such as sealants, ones including a polymer that mainly contains a propylene oxide polymer having 50% by weight or more propylene oxide repeating units are preferred because they are amorphous and have a relatively low viscosity.

Examples of the method for synthesizing a polyoxyalkylene polymer include, but not particularly limited to, a polymerization method with an alkali catalyst such as KOH; a polymerization method with a transition metal compound-porphyrin complex catalyst such as a complex produced by reaction between an organoaluminum compound and a porphyrin, as disclosed in JP-A S61-215623; a polymerization method with a double metal cyanide complex catalyst, as disclosed in JP-B S46-27250 and JP-B S59-15336 and U.S. Pat. Nos. 3,278,457, 3,278,458, 3,278,459, 3,427,256, 3,427,334 and 3,427,335, and other documents; a polymerization method with a catalyst containing a polyphosphazene salt, as disclosed in JP-A H10-273512; and a polymerization method with a catalyst containing a phosphazene compound, as disclosed in JP-A H11-060722.

Examples of the method for producing a polyoxyalkylene polymer containing a reactive silyl group include, but not particularly limited to, methods disclosed in JP-B S45-36319, and JP-B S46-12154, JP-A S50-156599, JP-A S54-6096, JP-A S55-13767, JP-A S55-13468 and JP-A S57-164123, JP-B H03-2450, and U.S. Pat. Nos. 3,632,557, 4,345,053, 4,366,307, and 4,960,844, and other documents; and methods disclosed in JP-A S61-197631, JP-A S61-215622, JP-A S61-215623, JP-A S61-218632, JP-A H03-72527, JP-A H03-47825, and JP-A 508-231707, which can provide polyoxyalkylene polymers with a high molecular weight and a narrow molecular weight distribution, namely, with a number average molecular weight of 6,000 or higher and Mw/Mn of 1.6 or less.

Each of the reactive silyl group-containing polyoxyalkylene polymers may be used alone, or two or more of the polymers may be used in combination.

The saturated hydrocarbon polymers mentioned above are polymers that are substantially free from any unsaturated carbon-carbon bonds except for aromatic rings.

Polymers forming the skeleton of these polymers are obtainable, for example, by (1) polymerizing a C2 to C6 olefin compound as a main monomer, such as ethylene, propylene, 1-butene, or isobutylene, or by (2) homopolymerizing a diene compound such as butadiene or isoprene or copolymerizing such a diene compound with the olefin compound, and then hydrogenating the resulting product. Here, isobutylene polymers and hydrogenated polybutadiene polymers are preferred because they allow easy introduction of a functional group into their terminal, easy control of the molecular weight, and an increase in the number of terminal functional groups. Isobutylene polymers are particularly preferred.

Organic polymers having a main chain skeleton of a saturated hydrocarbon polymer are characteristically excellent in heat resistance, weather resistance, durability, and moisture barrier property.

All monomer units of the isobutylene polymer may be isobutylene units, or alternatively, the isobutylene polymer may be a copolymer with another monomer. In terms of the rubber properties, the polymer preferably has 50% by weight or more, more preferably 80% by weight or more, and particularly preferably 90 to 99% by weight, of repeating units derived from isobutylene.

Various polymerization methods have been conventionally proposed as the method for synthesizing a saturated hydrocarbon polymer. In particular, many methods of so-called living polymerization have been developed in recent years. Saturated hydrocarbon polymers, especially isobutylene polymers, may be easily produced by inifer polymerization found by Kennedy et al. (J. P. Kennedy et al., J. Polymer Sci., Polymer Chem. Ed., 1997, Vol. 15, p. 2843). This method allows production of polymers having a molecular weight of about 500 to 100,000 at a molecular weight distribution of 1.5 or less and introduction of various functional groups into the molecular terminal.

Examples of the method for producing a saturated hydrocarbon polymer containing a reactive silyl group include, but not particularly limited to, methods disclosed in JP-B H04-69659, JP-B H07-108928, JP-A S63-254149, JP-A S64-22904, JP-A H01-197509, Japanese Patent Nos. 2539445 and 2873395, and JP-A H07-53882.

Each of the reactive silyl group-containing saturated hydrocarbon polymers may be used alone, or two or more of the polymers may be used in combination.

The (meth)acrylate ester monomers contained in the main chain of the (meth)acrylate ester polymers mentioned above are not particularly limited and various monomers may be used. Examples thereof include (meth)acrylate monomers such as (meth)acrylic acid, methyl(meth)acrylate, ethyl (meth)acrylate, n-propyl(meth)acrylate, isopropyl(meth) acrylate, n-butyl(meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, toluoyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl (meth)acrylate, 2-aminoethyl(meth)acrylate, γ-(methacryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, (meth)acrylic acid-ethylene oxide adducts, trifluoromethylmethyl(meth)acrylate, 2-trifluoromethylethyl(meth)acrylate, 2-perfluoroethylethyl (meth)acrylate, 2-perfluoroethyl-2-perfluorobutylethyl (meth)acrylate, perfluoroethyl(meth)acrylate, trifluoromethyl(meth)acrylate, bis(trifluoromethyl)methyl(meth)acrylate, 2-trifluoromethyl-2-perfluoroethylethyl(meth)acrylate, 2-perfluorohexylethyl(meth)acrylate, 2-perfluorodecylethyl (meth)acrylate, and 2-perfluorohexadecylethyl(meth)acrylate. The (meth)acrylate ester polymers include copolymers of such a (meth)acrylate ester monomer and a vinyl monomer as mentioned below. Examples of the vinyl monomer include: styrene monomers such as styrene, vinyltoluene, α-methylstyrene, chlorostyrene, and styrenesulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide;

vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. Each of these may be used alone, or a plurality of them may be copolymerized. Among these, in terms of physical properties of the resulting product, the polymer is preferably a polymer of a styrene monomer and of a (meth)acrylate monomer, more preferably a (meth)acrylic polymer of an acrylate ester monomer and of a methacrylate ester monomer, and particularly preferably an acrylic polymer of an acrylate ester monomer. For general building use, a butyl acrylate monomer is more preferably used because the composition is required to have low viscosity and the cured product thereof is required to have physical properties such as low modulus, high elongation, high weather resistance, and high heat resistance. Meanwhile, for uses that require properties including oil resistance, such as automotive applications, a copolymer mainly derived from ethyl acrylate is more preferably used. The polymer mainly derived from ethyl acrylate is likely to be slightly poor in low-temperature properties (cold resistance) while being excellent in oil resistance. In order to improve its low-temperature properties, some ethyl acrylate monomers may be replaced with butyl acrylate monomers. As the proportion of butyl acrylate increases, however, the good oil resistance is likely to be impaired. Hence, the proportion of the monomer is preferably 40% or lower, and more preferably 30% or lower, in the case where good oil resistance is required for use. In order to improve the properties such as low-temperature properties without impairing the oil resistance, it is also preferable to use a monomer in which an oxygen atom is introduced into the side-chain alkyl group, such as 2-methoxyethyl acrylate and 2-ethoxyethyl acrylate. Here, the introduction of an alkoxy group having an ether bond in the side chain is likely to cause poor heat resistance. Hence, the proportion of the monomer is preferably 40% or lower in the case where good heat resistance is required for use. Thus, suitable polymers can be produced by appropriate adjustment of the proportion in consideration of required physical properties such as oil resistance, heat resistance, and low-temperature properties, according to particular uses and requirements. For example, without any limitative meaning, mention may be made of copolymers of ethyl acrylate, butyl acrylate, and 2-methoxyethyl acrylate (weight ratio: 40-50/20-30/30-20) which have an excellent balance between physical properties including oil resistance, heat resistance, and low-temperature properties. In the present invention, these preferred monomers may be copolymerized, or even block-copolymerized with another monomer. In such a case, these preferred monomers are preferably contained in an amount of 40% by weight or more. It should be noted that the term "(meth)acrylate", for example, as used herein refers to "acrylate and/or methacrylate".

The (meth)acrylate ester polymer may be produced by any method such as conventionally known methods. Here, ordinary free radical polymerization, in which a compound such as an azo compound or a peroxide is used as a polymerization initiator, is disadvantageously likely to provide a polymer having typically a molecular weight distribution value as large as 2 or greater and having higher viscosity. Hence, living radical polymerization is preferred in order to produce a (meth)acrylate ester polymer having a narrow molecular weight distribution and low viscosity, and containing crosslinkable functional groups introduced at a high ratio into the molecular chain terminal.

A method more preferred for producing a (meth)acrylate ester polymer containing a specific functional group among the "living radical polymerization" methods is "atom transfer radical polymerization" in which (meth)acrylate ester monomers are polymerized using an initiator such as an organic halide or sulfonyl halide compound with a transition metal complex catalyst. This is because the atom transfer radical polymerization provides a polymer terminated with a halogen or the like group which is relatively advantageous to functional-group exchange reactions, and gives a high degree of freedom in selecting an initiator and a catalyst, as well as having the characteristics of the "living radical polymerization". Examples of the atom transfer radical polymerization include a method described in Matyjaszewski et al., Journal of the American Chemical Society (J. Am. Chem. Soc.), 1995, vol. 117, p. 5614.

A reactive silyl group-containing (meth)acrylate ester polymer may be produced by any method. Examples thereof include a free radical polymerization with a chain transfer agent, as disclosed in JP-B H03-14068, JP-B H04-55444, JP-A H06-211922, and other documents; and an atom transfer radical polymerization as disclosed in JP-A H09-272714 and other documents.

One species of the reactive silyl group-containing (meth)acrylate ester polymers may be used alone, or two or more species thereof may be used in combination.

Each of the reactive silyl group-containing organic polymers mentioned above may be used alone, or two or more of these may be used in combination. Specifically, organic polymers prepared as blends of two or more polymers selected from the group consisting of reactive silyl group-containing polyoxyalkylene polymers, reactive silyl group-containing saturated hydrocarbon polymers, and reactive silyl group-containing (meth)acrylate ester polymers may be used.

The method of producing an organic polymer as a blend of a reactive silyl group-containing polyoxyalkylene polymer and a reactive silyl group-containing (meth)acrylate ester polymer has been proposed in JP-A S59-122541, JP-A S63-112642, JP-A H6-172631, JP-A H11-116763, and other documents, and is not particularly limited thereto. Preferred specific examples thereof include a production method including blending a reactive silyl group-containing polyoxyalkylene polymer with a copolymer that contains a reactive silyl group and substantially contains, in the molecular chain, a (meth)acrylate ester monomer unit containing a C1 to C8 alkyl group represented by formula (10):

$$—CH_2—C(R^{13})(COOR^{14})— \quad (10)$$

(wherein $R^{13}$ is a hydrogen atom or a methyl group, and $R^{14}$ is a C1 to C8 alkyl group) and a (meth)acrylate ester monomer unit containing a C10 or higher alkyl group represented by formula (11):

$$—CH_2—C(R^{13})(COOR^{15})— \quad (11)$$

(wherein $R^{13}$ is defined as mentioned above, and $R^{15}$ is a C10 or higher alkyl group).

Examples of $R^{14}$ in formula (10) include C1 to C8, preferably C1 to C4, and more preferably C1 or C2 alkyl groups such as a methyl group, an ethyl group, a propyl group, an n-butyl group, a t-butyl group, and a 2-ethylhexyl group. For $R^{14}$s, one alkyl group may be used, or two or more alkyl groups may be used in combination.

Examples of $R^{15}$ in formula (11) include long-chain alkyl groups having 10 or more carbon atoms, typically 10 to 30 carbon atoms, and preferably 10 to 20 carbon atoms, such as a lauryl group, a tridecyl group, a cetyl group, a stearyl group, and a behenyl group. For $R^{15}$s, one alkyl group may be used, or two or more alkyl groups may be used in combination as in the case of $R^{14}$.

The (meth)acrylate ester polymer substantially contains the monomer units defined by formulas (10) and (11) in the molecular chain. The term "substantially" herein means that the total amount of the monomer units defined by formulas (10) and (11) in the copolymer is more than 50% by weight. The total amount of the monomer units of formulas (10) and (11) in the copolymer is preferably 70% by weight or more.

The ratio between the monomer units of formula (10) and formula (11) in the copolymer is preferably 95:5 to 40:60, and more preferably 90:10 to 60:40 by weight ratio.

Examples of monomer units which may be contained in the copolymer, other than the ones of formulas (10) and (11), include monomer units derived from acrylic acids such as acrylic acid and methacrylic acid; amide group-containing monomers such as acrylamide, methacrylamide, N-methylolacrylamide, and N-methylolmethacrylamide; epoxy group-containing monomers such as glycidyl acrylate and glycidyl methacrylate; amino group-containing monomers such as diethylaminoethyl acrylate, diethylaminoethyl methacrylate, and aminoethyl vinyl ether; and other monomers such as acrylonitrile, styrene, α-methylstyrene, alkyl vinyl ethers, vinyl chloride, vinyl acetate, vinyl propionate, and ethylene.

Some examples of the organic polymer as a blend of a reactive silyl group-containing saturated hydrocarbon polymer and a reactive silyl group-containing (meth)acrylate ester polymer are disclosed, for example, in JP-A H01-168764 and JP-A 2000-186176, and the organic polymer is not particularly limited thereto.

Moreover, organic polymers prepared as a blend with a reactive silyl group-containing (meth)acrylate ester polymer may also be produced by polymerization of a (meth)acrylate ester monomer in the presence of a reactive silyl group-containing organic polymer. Such production methods are specifically disclosed for example, but not limited to, in JP-A S59-78223, JP-A S59-168014, JP-A S60-228516, and JP-A S60-228517.

Meanwhile, the organic polymer may contain other components such as a urethane bond-containing component in the main chain skeleton, as long as they will not greatly impair the effects of the present invention.

The urethane bond-containing component is not particularly limited, and examples thereof include groups formed by reaction between an isocyanato group and an active hydrogen group (hereinafter, also referred to as amide segments).

The amide segments are groups represented by formula (12):

$$-NR^{16}-C(=O)- \quad (12)$$

wherein $R^{16}$ is a hydrogen atom or a monovalent organic group, preferably a substituted or unsubstituted C1 to C20 monovalent hydrocarbon group, and more preferably a substituted or unsubstituted C1 to C8 monovalent hydrocarbon group.

Specific examples of the amide segments include a urethane group formed by reaction between an isocyanate group and a hydroxy group; a urea group formed by reaction between isocyanate group and an amino group; and a thiourethane group formed by reaction between an isocyanate group and a mercapto group. In the present invention, the groups of formula (12) also include groups formed by reaction of active hydrogen in the urethane group, urea group, or thiourethane group with an isocyanate group.

Examples of industrially convenient production methods of organic polymers containing an amide segment and a reactive silyl group include a production method including the steps of reacting an organic polymer terminated with an active hydrogen-containing group with an excessive amount of a polyisocyanate compound to give a polymer containing an isocyanate group at the polyurethane main chain terminal; and thereafter or simultaneously, reacting all or a part of the isocyanate groups with the W group of a silicon compound represented by formula (13):

$$W-R^{17}-SiR^{6}_{3-a}X_{a} \quad (13)$$

wherein $R^{6}$s, Xs, and a are defined as mentioned above; is a divalent organic group, and is more preferably a substituted or unsubstituted C1 to C20 divalent hydrocarbon group; W is an active hydrogen-containing group selected from a hydroxy group, a carboxyl group, a mercapto group, and a (primary or secondary) amino group. Known production methods of organic polymers in connection with this production method include ones disclosed in JP-B S46-12154 (U.S. Pat. No. 3,632,557), JP-A 558-109529 (U.S. Pat. No. 4,374,237), JP-A S62-13430 (U.S. Pat. No. 4,645,816), JP-A H08-53528 (EP 0676403), JP-A H10-204144 (EP 0831108), JP-T 2003-508561 (U.S. Pat. No. 6,197,912), JP-A H06-211879 (U.S. Pat. No. 5,364,955), JP-A H10-53637 (U.S. Pat. No. 5,756, 751), JP-A H11-100427, JP-A 2000-169544, JP-A 2000-169545, JP-A 2002-212415, Japanese Patent No. 3313360, U.S. Pat. Nos. 4,067,844, and 3,711,445, and JP-A 2001-323040.

Mention also may be made of organic polymers produced by reacting an organic polymer terminated with an active hydrogen-containing group with a reactive silyl group-containing isocyanate compound represented by formula (14):

$$O=C=N-R^{17}-Si^{6}_{3-a}X_{a} \quad (14)$$

wherein $R^{6}$s, $R^{17}$, Xs, and a are defined as mentioned above. Known production methods of organic polymers in connection with this production method include ones disclosed in JP-A H11-279249 (U.S. Pat. No. 5,990,257), JP-A 2000-119365 (U.S. Pat. No. 6,046,270), JP-A S58-29818 (U.S. Pat. No. 4,345,053), JP-A H03-47825 (U.S. Pat. No. 5,068,304), JP-A H11-60724, JP-A 2002-155145, JP-A 2002-249538, WO 03/018658, and WO 03/059981.

Examples of the organic polymer terminated with an active hydrogen-containing group include hydroxy group-terminated oxyalkylene polymers (polyether polyols), polyacrylic polyols, polyester polyols, hydroxy group-terminated saturated hydrocarbon polymers (polyolefin polyols), polythiol compounds, and polyamine compounds. In particular, polyether polyols, polyacrylic polyols, and polyolefin polyols are preferred because they can provide organic polymers having a relatively low glass transition temperature and the cured products thereof are excellent in cold resistance. Especially, polyether polyols are particularly preferred as they provide organic polymers having good depth curability and adhesion property, and also having low viscosity to allow favorable workability. Polyacrylic polyols and saturated hydrocarbon polymers mentioned above are also more preferred because they provide organic polymers that give cured products with good weather resistance and heat resistance.

Organic polymers containing a group represented by the following formula (15) at the main chain terminal, obtainable by reacting a hydroxy group-terminated organic polymer and a reactive silyl group-containing isocyanate compound represented by formula (14) are preferred:

$$-O-C(=O)-NH-R^{17}-SiR^{6}_{3-a}X_{a} \quad (15)$$

wherein $R^{6}$s, $R^{17}$, Xs, and a are defined as mentioned above. This is because such organic polymers achieve excellent curability in the case of being combined with the component (B) in the present invention. The symbol "a" in formula (15) is preferably 3 because the resulting curable composition has particularly excellent curability and recovery.

Specific examples of the —$R^{17}$— include —$CH_2$—, —$CH_2CH_2CH_2$—, and —$CH_2CH_2CH_2CH_2CH_2CH_2$—. Among these, —$CH_2CH_2CH_2$— is more preferred in terms of availability.

As the polyether polyol, polyether polyols produced by any production methods may be used, and a preferred polyether polyol may be terminated with at least 0.7 hydroxy groups per molecular terminal on average of all the molecules. Specific examples thereof include oxyalkylene polymers produced with use of a conventional alkali metal catalyst, and oxyalkylene polymers produced by reacting an alkylene oxide with an initiator such as a polyhydroxy compound with at least two hydroxy groups in the presence of a double metal cyanide complex or cesium.

Among the polymerization methods mentioned above, polymerization methods using a double metal cyanide complex are preferred because they allow production of oxyalkylene polymers having a lower degree of unsaturation, narrow Mw/Mn, lower viscosity, high acid resistance, and high weather resistance.

Examples of the polyacrylic polyol include polyols which have a skeleton of a (meth)acrylic acid alkyl ester (co)polymer and contain a hydroxy group inside the molecule. The polymer may preferably be synthesized by living radical polymerization, and more preferably by atom transfer radical polymerization because these methods allow production of polymers having a narrow molecular weight distribution and low viscosity.

Specific examples of the polyisocyanate compound mentioned above include aromatic polyisocyanates such as toluene(tolylene)diisocyanate, diphenylmethane diisocyanate, and xylylene diisocyanate; and aliphatic polyisocyanates such as isophorone diisocyanate and hexamethylene diisocyanate.

The above silicon compound of formula (13) is not particularly limited, and specific examples thereof include amino group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy group-containing silanes such as γ-hydroxypropyltrimethoxysilane; and mercapto group-containing silanes such as γ-mercaptopropyltrimethoxysilane. Also usable as the silicon compound of formula (13) are Michael addition products derived from various α,β-unsaturated carbonyl compounds and primary amino group-containing silanes, and Michael addition products derived from various (meth)acryloyl group-containing silanes and primary amino group-containing compounds, as disclosed in JP-A H06-211879 (U.S. Pat. No. 5,364,955), JP-A H10-53637 (U.S. Pat. No. 5,756,751), JP-A H10-204144 (EP 0831108), JP-A 2000-169544, and JP-A 2000-169545.

The above reactive silyl group-containing isocyanate compound of formula (14) is not particularly limited, and specific examples thereof include γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate, and diethoxymethylsilylmethyl isocyanate. Also usable as the reactive silyl group-containing isocyanate compound of formula (14) are compounds obtained by reacting the silicon compound of formula (13) with an excessive amount of the polyisocyanate compound mentioned above, as disclosed in JP-A 2000-119365 (U.S. Pat. No. 6,046,270).

If the organic polymer (A) in the present invention contains a large amount of amide segments in the main chain skeleton, then the organic polymer may have high viscosity, leading to a composition with low workability. The presence of amide segments in the main chain skeleton of the organic polymer (A), however, tends to improve the curability of the composition of the present invention. Therefore, in the case that the organic polymer (A) contains amide segments in the main chain skeleton, the number of amide segments per molecule on average is preferably 1 to 10, more preferably 1.5 to 7, and particularly preferably 2 to 5. If the number is less than 1, sufficient curability may not be obtained, while if the number is greater than 10, the organic polymer may have high viscosity, leading to a composition with low workability.

The silanol condensation catalyst (B) used in the present invention is preferably one or two or more kinds of reaction products of a dialkyltin dicarboxylate represented by formula (1):

$$(R^1{}_2Sn(OCOR^2)_2 \qquad (1)$$

(wherein two $R^1$s each independently are a C5 to C17 monovalent hydrocarbon group, and two $R^2$s each independently are a C1 to C17 monovalent hydrocarbon group) and a tetraalkoxysilane represented by the following formula (2) and/or its partially hydrolyzed condensate:

$$Si(OR^3)_4 \qquad (2)$$

(wherein four $R^3$s each independently are a C1 or C2 hydrocarbon group). The component (B) functions as a catalyst that enables a hydroxy or hydrolyzable group bonded to a silicon atom in the organic polymer as the component (A) to form a siloxane bond.

Examples of the hydrocarbon group for $R^1$ in formula (1) include linear or branched alkyl groups and substituted or unsubstituted aryl groups, such as amyl, hexyl, heptyl, octyl, 2-ethylhexyl, nonyl, decyl, undecyl, dodecyl, tridecyl, tetradecyl, pentadecyl, hexadecyl, heptadecyl, phenyl, tolyl, and cyclohexyl groups. The carbon number of the hydrocarbon group for $R^1$ is required to be any one of 5 to 17, preferably 6 to 12, more preferably 7 to 10, and particularly preferably 8. A bulkier hydrocarbon group having a greater carbon number produces a larger effect of improving the recovery, while a hydrocarbon group having a carbon number of less than 5 is less likely to achieve favorable recovery. However, the carbon number greater than 17 is less likely to achieve favorable curability, and also tends to increase the crystallinity of the dialkyltin dicarboxylate, thereby making it difficult to handle. Also, the carbon number greater than 17 is likely to increase the crystallinity of the component (B) and thereby decrease the compatibility of the component (B) with the component (A), and to increase the viscosity and thereby decrease the curability and workability of the curable composition of the present invention.

Examples of the hydrocarbon group for $R^2$ in formula (1) include linear or branched alkyl groups and substituted or unsubstituted aryl groups, such as methyl, ethyl, n-propyl, isopropyl, n-butyl, isobutyl, t-butyl, amyl, hexyl, heptyl, octyl, 2-ethylhexyl, nonyl, decyl, undecyl, dodecyl, tridecyl, tetradecyl, pentadecyl, hexadecyl, heptadecyl, phenyl, tolyl, and cyclohexyl groups. The carbon number of the hydrocarbon group for $R^2$ is required to be any one of 1 to 17, preferably 1 to 12, more preferably 1 to 8, still more preferably 1 to 4, even more preferably 1 or 2, and particularly preferably 1. A hydrocarbon group having a smaller carbon number tends to result in much reduction in the boiling point of the by-product, a carboxylate ester ($R^2COOR^3$), which facilitates separation and removal of the by-product. However, the carbon number greater than 17 tends to increase the crystallinity of the dialkyltin dicarboxylate, thereby making it difficult to handle.

Specific examples of the dialkyltin dicarboxylate represented by formula (1) include dioctyltin diacetate, dioctyltin dibutylate, dioctyltin dioctylate, dioctyltin di-2-ethylhexanoate, dioctyltin dilaurate, dilauryltin diacetate, dilauryltin dibutylate, dilauryltin dioctylate, dilauryltin di-2-ethylhexanoate, and dilauryltin dilaurate. Among these, dioctyltin diacetate, dioctyltin dibutylate, dilauryltin diacetate, and dilauryltin dibutylate are preferred in terms of easiness to remove the generated carboxylate ester. Furthermore, dioctyltin diacetate and dioctyltin dibutylate are more preferred, and dioctyltin diacetate is particularly preferred, in terms of availability.

Examples of the hydrocarbon group for $R^3$ in formula (2) include methyl and ethyl groups. The carbon number of the hydrocarbon group for $R^3$ is required to be 1 or 2, and preferably 2. If the carbon number of $R^3$ is more than 2, favorable water-resistant adhesion may not be achieved. Also, a tetraalkoxysilane with the carbon number of $R^3$ being 1 and/or its partially hydrolyzed condensate tend to have high toxicity, and may not lead to favorable recovery. Therefore, the carbon number of $R^3$ is most preferably 2.

Specific examples of the tetraalkoxysilane represented by formula (2) and/or its partially hydrolyzed condensate include tetraalkoxysilanes such as tetramethoxysilane, tetraethoxysilane, trimethoxyethoxysilane, dimethoxydiethoxysilane, and methoxytriethoxysilane, and partially hydrolyzed condensates thereof. Among these, tetraethoxysilane and partially hydrolyzed condensates of tetraethoxysilane are preferred, and tetraethoxysilane is more preferred.

The dialkyltin disilicate compound, which is a reaction product of a dialkyltin dicarboxylate and a tetraalkoxysilane and/or its partially hydrolyzed condensate, can be obtained by reacting the dialkyltin dicarboxylate represented by formula (1) and the tetraalkoxysilane represented by formula (2) and/or its partially hydrolyzed condensate preferably at 50° C. to 150° C., and particularly preferably 100° C. to 130° C., preferably for about 0.1 to 5 hours, and particularly preferably about 1 to 3 hours, and then removing the generated carboxylate ester under reduced pressure. The reaction ratio is preferably such that at least one equivalent of alkoxy groups are reacted with one equivalent of carboxyl groups so as to completely eliminate the carboxyl groups. Residual carboxyl groups decrease the catalytic activity. The reaction may be allowed to proceed in the presence or absence of a solvent, but is usually preferably allowed to proceed in the absence of a solvent.

The structure of the resulting reaction product depends on the ratio of the tetraalkoxysilane and/or its partially hydrolyzed condensate added to the dialkyltin dicarboxylate, and other factors. A preferred example of the reaction product is a dialkyltin disilicate compound represented by formula (4):

$$R^1{}_2Sn\{OSi(OR^3)_3\}_2 \quad (4)$$

wherein two $R^1$s each independently are a C5 to C17 monovalent hydrocarbon group, and six $R^3$s each independently are a C1 or C2 hydrocarbon group, which can be obtained by reacting 1 mole of the dialkyltin dicarboxylate represented by formula (1) and 2 moles or more, preferably 2 to 6 moles, of the tetraalkoxysilane represented by formula (2).

Specific examples of $R^1$ and $R^3$ in formula (4) include the aforementioned hydrocarbon groups.

The reaction product in the present invention has very high catalytic activity compared with conventional dialkyltin compounds carrying a bulky alkyl group, and is preferably mixed with the tetraalkoxysilane represented by formula (2) and/or its partially hydrolyzed condensate for use in terms of the stability and workability of the catalyst. The mixing ratio is, provided that the total amount of them is 100 parts by weight, preferably 1 to 99 parts by weight of the tetraalkoxysilane and/or its partially hydrolyzed condensate relative to 99 to 1 part by weight of the reaction product, and more preferably 10 to 50 parts by weight of the tetraalkoxysilane and/or its partially hydrolyzed condensate relative to 90 to 50 parts by weight of the reaction product. The mixture of them may also be obtained by synthesizing the reaction product and then mixing the reaction product with the tetraalkoxysilane and/or its partially hydrolyzed condensate, or by reacting a dialkyltin oxydicarboxylate with a large excess of the tetraalkoxysilane and/or its partially hydrolyzed condensate.

The amount of the silanol condensation catalyst (B) added is preferably 0.1 to 10 parts by weight, more preferably 0.2 to 5 parts by weight, still more preferably 0.5 to 4 parts by weight, and particularly preferably 1 to 3 parts by weight, for each 100 parts by weight of the reactive silyl group-containing organic polymer (A). If the amount of the component (B) is less than the minimum value of the range, the curing rate may be decreased. If the amount of the component (B) is more than the maximum value of the range, the working life of the composition may be too short, which may decrease the workability, and the recovery of the cured product may be decreased.

The present invention employs a dialkyltin compound as the silanol condensation catalyst of the component (B), and another curing catalyst may be used in combination to the extent that the effects of the present invention are not reduced. Specific examples thereof include titanium compounds such as tetrabutyl titanate, tetrapropyl titanate, tetrakis(acetylacetonato)titanium, and bis(acetylacetonato)diisopropoxytitanium; organoaluminum compounds such as tris(acetylacetonato)aluminum, tris(ethylacetoacetato)aluminum, and diisopropoxyaluminum ethylacetoacetate; zirconium compounds such as tetrakis(acetylacetonato)zirconium; various metal salts of carboxylic acids, such as tin 2-ethylhexanoate, bismuth 2-ethylhexanoate, titanium 2-ethylhexanoate, zirconium 2-ethylhexanoate, iron 2-ethylhexanoate, tin neodecanoate, bismuth neodecanoate, iron neodecanoate, titanium neodecanoate, and zirconium neodecanoate; various carboxylic acids such as 2-ethylhexanoic acid and neodecanoic acid; and various nitrogen-containing compounds such as laurylamine, stearylamine, dioctylamine, oleylamine, triethylenetetramine, 3-lauryloxypropylamine, 3-diethylaminopropylamine, hexamethylenediamine, guanidine, 2,4,6-tris(dimethylaminomethyl)phenol, N-methylmorpholine, 2-ethyl-4-methylimidazole, 1,8-diazabicyclo(5,4,0)undecene-7 (DBU), and 1,5-diazabicyclo(4,3,0)nonene-5 (DBN).

The present invention employs, as the component (C), an amino silane coupling agent containing an —$NH_2$ group and a group represented by formula (3):

$$—SiR^4{}_{3-b}(OR^5)_b \quad (3)$$

wherein 3−b $R^4$s each independently are a C1 to C20 hydrocarbon group, b $R^5$s each independently are a C1 or C2 hydrocarbon group, and b is 1, 2, or 3. The amino silane coupling agent, when used in combination with the component (B) in the present invention, accelerates the catalytic activity of the component (B) and can achieve highly practical, favorable curability. Also, the amino silane coupling agent contributes to improvement of the adhesion property.

Specific examples of $R^4$ in formula (3) include alkyl groups such as methyl and ethyl groups, cycloalkyl groups such as a cyclohexyl group, aryl groups such as a phenyl group, and aralkyl groups such as a benzyl group. Among these, a methyl group is particularly preferred.

Examples of the hydrocarbon group for $R^5$ in formula (3) include methyl and ethyl groups. The carbon number of the hydrocarbon group for $R^5$ is required to be 1 or 2, and the hydrocarbon group is preferably a C1 methyl group in terms of curability. If the carbon number of $R^5$ is greater than 2, the curability of the curable composition of the present invention is likely to be decreased after storage.

The value of b in formula (3) is 1, 2, or 3, and is preferably 2 or 3, and more preferably 3, in terms of recovery of the cured product. The amino silane coupling agent (C1) with b being 3 significantly improves the adhesion while maintaining relatively high recovery of the cured product. Regarding the aminosilane coupling agent (C2) with b being 1 or 2, on the other hand, a large amount of the agent significantly decreases the recovery of the cured product. Therefore, the present invention requires that the content of the amino silane coupling agent (C1) with b in formula (3) being 3 be 1 to 10 parts by weight while the content of the amino silane coupling agent (C2) with b in formula (3) being 1 or 2 be less than 1 part by weight.

$R^7$ in formula (5) for the component (A) and $R^5$ in formula (3) for the component (C) are preferably the same groups because, in this case, a decrease in the curability of the curable composition of the present invention after storage is small.

The amino silane coupling agent added in the curable composition of the present invention serves to significantly improves the adhesion of the curable composition to various adherends including inorganic base materials such as glass, aluminum, stainless steel, zinc, copper, and mortar, and organic base materials such as polyvinyl chloride, acrylic resin, polyester, polyethylene, polypropylene, and polycarbonate, under non-primer conditions or primer-treated conditions. Under non-primer conditions, the effect of improving the adhesion to various adherends is particularly significant.

Specific examples of the primary amino group-containing silane coupling agent (C1) with b in formula (3) being 3 include γ-aminopropyltrimethoxysilane, γ-aminopropyltriethoxysilane, γ-(2-aminoethyl)aminopropyltrimethoxysilane, γ-(2-aminoethyl)aminopropyltriethoxysilane, and γ-(6-aminohexyl)aminopropyltrimethoxysilane.

Specific examples of the primary amino group-containing silane coupling agent (C2) with b in formula (3) being 1 or 2 include γ-aminopropylmethyldimethoxysilane, γ-aminopropylmethyldiethoxysilane, γ-(2-aminoethyl)aminopropylmethyldimethoxysilane, γ-(2-aminoethyl)aminopropylmethyldiethoxysilane, and γ-(6-aminohexyl) aminopropylmethyldimethoxysilane.

The content of the component (C1) is required to be 1 to 10 parts by weight for each 100 parts by weight of the polymer (A), and is preferably 1.5 to 7 parts by weight, more preferably 2 to 5 parts by weight, and still more preferably 2.5 to 4 parts by weight. If the content of the component (C1) is less than the minimum value of the above range, the effects of improving the adhesion property and curability may not be achieved sufficiently. If the content of the component (C1) is more than the maximum value of the above range, the elongation property and depth curability tend to decrease.

The content of the component (C2) is required to be less than 1 part by weight for each 100 parts by weight of the polymer (A), and is preferably less than 0.5 parts by weight, more preferably less than 0.3 parts by weight, still more preferably less than 0.1 parts by weight, and most preferably zero. If the content is more than the maximum value of the above range, the recovery tends to decrease.

The present invention employs a primary amino group-containing silane coupling agent as the component (C), and another amino group-containing silane coupling agent may be used in combination to the extent that the effects of the present invention are not reduced. Specific examples thereof include 3-(N-ethylamino)-2-methylpropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, N,N'-bis[3-(trimethoxysilyl)propyl]ethylenediamine, N-cyclohexylaminomethyltriethoxysilane, N-cyclohexylaminomethyldiethoxymethylsilane, and N-phenylaminomethyltrimethoxysilane.

The present invention may optionally employ, as the component (D), a silicon compound represented by formula (6):

$$R^8_{4-c}Si(OR^9)_c \quad (6)$$

wherein 4−c $R^8$s each independently are an unsubstituted C1 to C20 hydrocarbon group or a substituted C1 to C20 hydrocarbon group with a substituent other than an amino group, c $R^9$s each independently are a C1 or C2 hydrocarbon group, and c is 1, 2, 3, or 4. The silicon compound is, in other words, a silane coupling agent free from amino groups which functions as a dehydrating agent for securing one-pack storage stability of the curable composition of the present invention and as a physical-property modifier for improving the physical properties and recovery of the cured product.

Specific examples of $R^8$ in formula (6) include alkyl groups such as methyl and ethyl groups, alkenyl groups such as a vinyl group, cycloalkyl groups such as a cyclohexyl group, aryl groups such as a phenyl group, and aralkyl groups such as a benzyl group. Among these, a methyl group and a vinyl group are particularly preferred.

Examples of the hydrocarbon group for $R^9$ in formula (6) include methyl and ethyl groups. The carbon number of the hydrocarbon group for $R^5$ is required to be 1 or 2, and the hydrocarbon group is preferably a C1 methyl group in terms of curability. If the carbon number of $R^9$ is more than 2, the curability of the curable composition of the present invention is likely to be decreased after storage.

The value of c in formula (6) is 1, 2, 3, or 4, preferably 2, 3, or 4, more preferably 3 or 4, and particularly preferably 4, in terms of recovery of the cured product. The silicon compound (D1) with c being 3 or 4 functions effectively as a dehydrating agent and a physical-property modifier, while maintaining relatively high recovery of the cured product. Regarding the silicon compound (D2) with c being 1 or 2, on the other hand, a large amount of the compound significantly decreases the recovery of the cured product. Therefore, in the case that the present invention employs the component (D), it is preferable that the content of the silicon compound (D1) with c in formula (6) being 3 or 4 be 1 to 10 parts by weight while the content of the silicon compound (D2) with c in formula (6) being 1 or 2 be less than 1 part by weight.

$R^7$ in formula (5) for the component (A), $R^5$ in formula (3) for the component (C), and $R^9$ in formula (6) for the component (D) are preferably the same groups because, in this case, a decrease in the curability of the curable composition of the present invention after storage is small.

Specific examples of the silicon compound (D1) with c in formula (6) being 3 or 4 include isocyanato group-containing silanes such as γ-isocyanatopropyltrimethoxysilane, γ-isocyanatopropyltriethoxysilane, and trimethoxysilylmethylisocyanate; ketimine silanes such as N-(1,3-dimethylbutylidene)-3-(triethoxysilyl)-1-propaneamine; mercapto group-containing silanes such as γ-mercaptopropyltrimethoxysilane, and γ-mercaptopropyltriethoxysilane; epoxy group-containing silanes such as γ-glycidoxypropyltrimethoxysilane, γ-glycidoxypropyltriethoxysilane, β-(3,4-epoxycyclohexyl)ethyltrimethoxysilane, and β-(3,4-epoxycyclohexyl)ethyltriethoxysilane; vinyl unsaturated group-containing silanes such as vinyltrimethoxysilane, vinyltriethoxysilane, γ-methacryloyloxypropyltrimethoxysilane, and γ-acryloyloxypropyltriethoxysilane; silicates such as tetraalkoxysilanes (e.g. tetraethoxysilane, tetramethoxysilane) and partially hydrolyzed condensates thereof; halogen-containing silanes such as γ-chloropropyltrimethoxysilane; and isocyanurate silanes such as tris(trimethoxysilyl)isocyanurate.

Specific examples of the silicon compound (D2) with c in formula (6) being 1 or 2 include isocyanato group-containing silanes such as γ-isocyanatopropylmethyldiethoxysilane, γ-isocyanatopropylmethyldimethoxysilane, and dimethoxymethylsilylmethylisocyanate; ketimine silanes such as N-(1,3-dimethylbutylidene)-3-(methyldimethoxysilyl)-1-propaneamine; mercapto group-containing silanes such as γ-mercaptopropylmethyldimethoxysilane, and γ-mercaptopropylmethyldiethoxysilane; epoxy group-containing silanes such as γ-glycidoxypropylmethyldimethoxysilane and β-(3,4-epoxycyclohexyl)ethylmethyldimethoxysilane; vinyl unsaturated group-containing silanes such as vinylmethyldimethoxysilane and γ-methacryloyloxypropylmethyldimethoxysilane; halogen-containing silanes such as γ-chloropropylmethyldimethoxysilane; and isocyanurate silanes such as tris(methyldimethoxysilyl)isocyanurate.

The content of the component (D1) is preferably 1 to 10 parts by weight, more preferably 1.5 to 7 parts by weight, and still more preferably 2 to 4 parts by weight, for each 100 parts by weight of the polymer (A). If the content of the component (D1) is less than the minimum value of the above range, the effect of improving the physical properties and one-pack storage stability may not be achieved sufficiently. If the content of the component (D1) is more than the maximum value of the above range, the elongation property and depth curability tend to decrease.

The content of the component (D2) is preferably less than 1 part by weight, more preferably less than 0.5 parts by weight, still more preferably less than 0.3 parts by weight, particularly preferably less than 0.1 parts by weight, and most preferably zero, for each 100 parts by weight of the polymer (A). If the content of the component (D2) is more than the maximum value of the above range, the recovery tends to decrease.

<<Curable Composition>>

Various additives may be added in the curable composition of the present invention, depending on the desired physical properties.

<Filler>

The curable composition of the present invention may contain a filler. Examples of the filler include reinforcing fillers such as fumed silica, precipitated silica, crystalline silica, fused silica, dolomite, silicic anhydride, hydrous silicic acid, and carbon black; fillers such as heavy calcium carbonate, colloidal calcium carbonate, magnesium carbonate, diatomite, calcined clay, clay, talc, titanium oxide, bentonite, organic bentonite, ferric oxide, fine aluminum powder, flint powder, zinc oxide, activated zinc white, shirasu balloons, glass microballoons, organic microballoons of phenol resin or vinylidene chloride resin, and resin powders including PVC powder and PMMA powder; and fibrous fillers such as asbestos, glass fiber, and filaments. In the case of using a filler, the amount thereof is 1 to 250 parts by weight, and preferably 10 to 200 parts by weight, for each 100 parts by weight of the polymer (A).

Such a filler may be previously dehydrated and dried by uniformly mixing the filler with a dehydrating agent such as calcium oxide, and then leaving the mixture to stand in a sealed bag made of an airtight material for an appropriate period of time, as disclosed in JP-A 2001-181532. Use of such a filler with low moisture content improves the storage stability particularly in the case that a one-pack composition is prepared.

In the case that a composition having high transparency is desired, a polymer powder made of a polymer (e.g. methyl methacrylate), non-crystalline silica or the like may be used as the filler, as disclosed in JP-A H11-302527. Use of a compound such as hydrophobic silica, which is fine powder of silicon dioxide having hydrophobic groups on its particle surface, as the filler enables to obtain a highly transparent composition, as disclosed in JP-A 2000-38560. The surface of fine powder of silicon dioxide is generally occupied by silanol (—SiOH) groups. The hydrophobic silica, so referred to herein, is a product obtained by reacting these silanol groups with an organosilicon halide, an alcohol or the like to give the groups: —SiO-hydrophobic groups. More specifically, the hydrophobic silica is obtained by reacting silanol groups on fine powder of silicon dioxide with a compound to be bonded, such as dimethylsiloxane, hexamethyldisilazane, dimethyldichlorosilane, trimethoxyoctylsilane, and trimethylsilane. It is noted that fine powder of silicon dioxide whose surface is occupied by silanol (—SiOH) groups is called fine powder of hydrophilic silica.

In order to obtain a cured product having high strength by the use of such a filler, reinforcing fillers mainly selected from fumed silica, precipitated silica, crystalline silica, fused silica, dolomite, silicic anhydride, hydrous silicic acid, carbon black, colloidal calcium carbonate, calcined clay, clay, activated zinc white and the like are preferred. In terms of economic efficiency and a reinforcing effect, colloidal calcium carbonate is more preferred. The reinforcing filler achieves favorable results if its amount used is in the range of 1 to 300 parts by weight, preferably 5 to 250 parts by weight, more preferably 20 to 200 parts by weight, and particularly preferably 50 to 150 parts by weight, for each 100 parts by weight of the reactive silyl group-containing organic polymer (A). In order to obtain a cured product having low strength and low elongation, fillers mainly selected from titanium oxide, heavy calcium carbonate, magnesium carbonate, talc, ferric oxide, zinc oxide, shirasu balloons and the like are preferred. Among these, heavy calcium carbonate is more preferred in terms of economic efficiency. Addition of a large amount of heavy calcium carbonate results in production of a composition at low cost but greatly decreases the elongation property. Hence, to achieve favorable results, the amount to be added should be 180 parts by weight or less for each 100 parts by weight of the reactive silyl group-containing organic polymer (A). The amount is more preferably 5 to 150 parts by weight, and particularly preferably 20 to 120 parts by weight. Generally, calcium carbonate with a greater specific surface area has a larger effect in improving the adhesion property, and the tensile strength at break and elongation at break of the cured product. Of course each of these fillers may be used alone, or two or more of these may be used in admixture. In the case of using calcium carbonate, it is preferable to combine colloidal calcium carbonate with calcium carbonate having a large particle size, such as heavy calcium carbonate. The colloidal calcium carbonate preferably has a particle size of 0.5 µm or smaller, and the surface thereof is preferably treated with a fatty acid or a fatty acid salt. The particle size of the calcium carbonates having a large particle size is preferably 1 µm or greater, and the particles without surface treatment may be used.

It is preferable to add organic balloons or inorganic balloons so as to improve the workability (e.g. coating workability) of the composition and to provide a matte surface to the cured product. The surfaces of these fillers may be treated. Each of these fillers may be used alone, or two or more of these fillers may be used in admixture. In order to improve the workability (e.g. coating workability), the particle size of balloons is preferably 0.1 mm or smaller. In order to provide a matte surface to the cured product, the particle size is preferably 5 to 300 µm.

The composition of the present invention gives a cured product with favorable chemical resistance, and thus the composition can be suitably applied to the joints of exterior walls of houses, such as siding boards, particularly ceramic siding boards, adhesives for exterior wall tiles, adhesives for exterior wall tiles that are intended to remain in the joints as they are, and the like. Here, it is preferable to bring the design of a sealing material in line with the exterior wall design. As exterior walls, in particular, those with luxurious feeling created by, for example, sputter coating or incorporation of colored aggregates have been used. When a scaly or particulate substance having a diameter of 0.1 mm or greater, preferably about 0.1 to 5.0 mm, is added in the composition of the present invention, the cured product matches up with such luxurious exterior walls and, in addition, shows good chemical resistance, which means that the composition is enabled to give an excellent cured product capable of retaining the appearance over years. When a particulate substance is used, a sanded or sandstone-like coarse surface can be formed. When a scaly substance is used, an irregular surface resulting from its scaly shape can be formed.

As described in JP-A H09-53063, the preferred diameter, amount, material and the like of the scaly or particulate substance are as follows.

The preferred diameter is 0.1 mm or larger and more preferably about 0.1 to 5.0 mm, and can be selected appropriately according to the material, pattern, or the like of the exterior wall. Those substances with a diameter of about 0.2 to 5.0 mm or about 0.5 to 5.0 mm are also usable. In the case of a scaly substance, the thickness of the substance should be about 1/10 to 1/5 of the diameter (that is, the thickness is about 0.01 to 1.00 mm). The scaly or particulate substance is previously mixed with a sealing base material to give a sealing material before transportation to the work site, or is mixed with a sealing base material at the work site before use.

The scaly or particulate substance is added in a range from about 1 to 200 parts by weight for each 100 parts by weight of the composition such as a sealant composition or an adhesive composition. The amount to be added is selected appropriately according to the particular size of the scaly or particulate substance, the material and pattern of the exterior wall, and the like.

Examples of the scaly or particulate substance include natural substances such as silica sand and mica, synthetic rubber, synthetic resin, and inorganic materials such as alumina. To improve the design quality when the substance is used for filling the joint, the scaly or particulate substance is colored with a suitable color according to the material and pattern and the like of the exterior wall.

A preferred finishing method is described in JP-A H09-53063.

Also, if a balloon (preferably with an average particle size of 0.1 mm or larger) is used for the same purpose, a sanded or sandstone-like coarse surface can be formed and at the same time the weight can be reduced. As described in JP-A H10-251618, the preferred diameter, amount, material and the like of the balloon are as follows.

The balloon is a spherical filler having a hollow inside. The material of the balloon may be an inorganic material such as glass, shirasu, and silica; or an organic material such as phenol resin, urea resin, polystyrene, and Saran. The material is not limited to these examples, and an inorganic material and an organic material may be compounded or may be layered to form a multilayer. Inorganic, organic, or their composite balloons may be used. Also, the balloon to be used may be of a single type, or may be a mixture of multiple balloons made of different materials. Further, the surface of the balloon to be used may be processed or coated, or may be treated with various kinds of surface treating agents. For example, an organic balloon may be coated with calcium carbonate, talc, titanium oxide, or the like; or an inorganic balloon may be surface-treated with a silane coupling agent.

To obtain the sanded or sandstone-like coarse surface, the particle size of the balloon is preferably 0.1 mm or larger. Balloons having a particle size of about 0.2 to 5.0 mm or about 0.5 to 5.0 mm are also usable. Balloons with a particle size of smaller than 0.1 mm may only increase the viscosity of the composition so that the coarse texture cannot be obtained even when they are added in a large amount. The amount of the balloon can be easily determined according to the coarseness of the desired sanded or sandstone-like texture. Generally, it is desirable to add a balloon having a particle size of 0.1 mm or larger to the extent to give a volume concentration of 5 to 25 vol % in the composition. If the volume concentration of the balloon is lower than 5 vol %, no coarse texture is likely to be obtained. If the concentration exceeds 25 vol %, the balloon tends to increase the viscosity of the sealing material or adhesive to reduce the workability, and increase the modulus of the cured product to deteriorate the basic properties of the sealing material or adhesive. The volume concentration is particularly preferably 8 to 22 vol % in terms of the balance with the basic properties of the sealing material.

In the case of using a balloon, it is possible to add a slip preventing agent as described in JP-A 2000-154368, and an amine compound for giving a matte appearance as well as an irregular appearance to the surface of the cured product, particularly a primary and/or secondary amine with a melting point of 35° C. or higher, as described in JP-A 2001-164237.

Specific examples of the balloon include ones described in JP-A H02-129262, JP-A H04-8788, JP-A H04-173867, JP-A H05-1225, JP-A H07-113073, JP-A H09-53063, JP-A H10-251618, JP-A 2000-154368, JP-A 2001-164237, and WO 97/05201.

Also, thermoexpandable hollow microspheres described in JP-A 2004-51701, JP-A 2004-66749 and the like may be used. The terms "thermoexpandable hollow microspheres" means plastic spheres obtained by spherically enclosing a low boiling point compound such as a C1 to C5 hydrocarbon in a polymer shell (vinylidene chloride copolymer, acrylonitrile copolymer, or vinylidene chloride-acrylonitrile copolymer). When such a composition is used for bonding and the bonded part is heated, the gas pressure inside the shell of the thermoexpandable hollow microspheres increases while the polymer shell softens, which results in great expansion of the volume, thereby separating the adhesive interface. Addition of the thermoexpandable hollow microspheres enables to obtain a thermally peelable adhesive composition which, at the time of disposal, can be easily peeled without breaking materials, just by heating with no use of any organic solvents.

Even in the case where the composition of the present invention contains particles of a cured sealing material, the resulting cured product can be provided with an irregular surface and an improved design. As described in JP-A 2001-115142, the preferred diameter, amount, material and the like of the particles of a cured sealing material are as follows. The diameter is preferably 0.1 to 1 mm and more preferably about 0.2 to 0.5 mm. The amount to be added is preferably 5 to 100% by weight and more preferably 20 to 50% by weight of the curable composition. The material may be urethane resin, silicone, modified silicone, polysulfide rubber, or the like, and the material is not particularly limited as long as it is usable for sealing materials. Modified silicone-based sealing materials are preferred.

<Tackifier>

The composition of the present invention may contain a tackifier. The tackifier resin is not particularly limited, and ones usually used, regardless of their states of being solid or liquid at room temperature, can be used. Specific examples of the tackifier resin include styrene block copolymers and hydrogenated products thereof, phenol resins, modified phenol resins (e.g. cashew oil-modified phenol resins, tall oil-modified phenol resins), terpene phenol resins, xylene-phenol resins, cyclopentadiene-phenol resins, cumarone indene resins, rosin resins, rosin ester resins, hydrogenated rosin ester resins, xylene resins, low molecular weight polystyrene resins, styrene copolymer resins, petroleum resins (e.g., C5 hydrocarbon resins, C9 hydrocarbon resins, C5/C9 copolymer resins), hydrogenated petroleum resins, terpene resins, and DCPD petroleum resins. Each of these may be used alone, or two or more of these may be used in combination. Examples of the styrene block copolymers and hydrogenated products thereof include styrene-butadiene-styrene block copolymers (SBS), styrene-isoprene-styrene block copolymers (SIS), styrene-ethylene-butylene-styrene block copolymers (SEES), styrene-ethylene-propylene-styrene block copolymers (SEPS), and styrene-isobutylene-styrene block copolymers (SIBS). Each of the above-mentioned tackifier resins may be used alone, or two or more of them may be used in combination.

The tackifier resin may be used in the range of 5 to 1,000 parts by weight, and preferably 10 to 100 parts by weight, for each 100 parts by weight of the organic polymer (A).

<Thermoplastic Elastomer>

The composition of the present invention may contain a thermoplastic elastomer. The thermoplastic elastomer is not particularly limited, and specific examples thereof include styrene block copolymers and hydrogenated products thereof. Examples of the styrene block copolymers and hydrogenated products thereof include styrene-butadiene-styrene block copolymers (SBS), styrene-isoprene-styrene block copolymers (SIS), styrene-ethylene-butylene-styrene block copolymers (SEES), styrene-ethylene-propylene-styrene block copolymers (SEPS), styrene-isobutylene-styrene block copolymers (SIBS), and modified styrene-ethylene-butylene block copolymers. Each of these thermoplastic elastomers may be used alone, or two or more of these may be used in combination.

Addition of a large amount of the thermoplastic elastomer tends to lead to a non-uniform composition having low compatibility. Hence, in terms of the storage stability and recovery, the amount to be added is preferably 20 parts by weight or less for each 100 parts by weight of the reactive silyl group-containing organic polymer (A). The amount to be added is more preferably 10 parts by weight or less, still more preferably 5 parts by weight or less, and particularly preferably zero.

<Liquid Polyisoprene Polymer>

The composition of the present invention may contain a liquid polyisoprene polymer. The liquid polyisoprene polymer is not particularly limited, and specific examples thereof include liquid polyisoprene homopolymer, copolymer of isoprene and styrene, copolymer of isoprene and butadiene, maleic anhydride-modified polyisoprene, and hydrogenated polyisoprene. The ratio of isoprene monomer units in the liquid polyisoprene polymer is not particularly limited, and is preferably 50% by weight or higher. In the case of hydrogenated polyisoprene, the ratio can be the ratio of isoprene monomer units in the polymer before hydrogenation, and the ratio of isoprene monomer units in the polymer is preferably 50% by weight or higher. Specific products of the polymer include LIR from Kuraray Co., Ltd. Each of these liquid polyisoprene polymers may be used alone, or two or more of these may be used in combination.

Addition of a large amount of the liquid polyisoprene polymer tends to lead to a non-uniform composition having low compatibility. Hence, in terms of the storage stability and recovery, the amount to be added is preferably 20 parts by weight or less for each 100 parts by weight of the reactive silyl group-containing organic polymer (A). The amount to be added is more preferably 10 parts by weight or less, still more preferably 4 parts by weight or less, and particularly preferably zero.

<Plasticizer>

The curable composition of the present invention may contain a plasticizer. Addition of a plasticizer enables to adjust the viscosity and slump properties of the curable composition, and the mechanical properties such as tensile strength and elongation of a cured product obtained by curing the curable composition. Examples of the plasticizer include phthalate esters such as dibutyl phthalate, diheptyl phthalate, di(2-ethylhexyl)phthalate, and butyl benzyl phthalate; esters of non-aromatic dibasic acids such as dioctyl adipate, dioctyl sebacate, dibutyl sebacate, and isodecyl succinate; aliphatic esters such as butyl oleate and methyl acetylricinoleate; phosphate esters such as tricresyl phosphate and tributyl phosphate; trimellitate esters; chlorinated paraffins; hydrocarbon oils such as alkyldiphenyls and partially hydrogenated terphenyls; process oils; and epoxy plasticizers such as epoxidized soybean oil and benzyl epoxystearate.

Also, polymer plasticizers may be used. In the case of using a polymer plasticizer, the initial physical properties can be maintained for a long period of time compared with the case of using a low-molecular-weight plasticizer which is a plasticizer containing no polymer moiety in the molecule. The drying properties (also referred to as coating properties) of an alkyd coating material applied to the cured product can also be improved. Specific examples of the polymer plasticizer include, but not limited to, vinyl polymers obtained by polymerizing vinyl monomers by various methods; esters of polyalkylene glycols, such as diethylene glycol dibenzoate, triethylene glycol dibenzoate, and pentaerythritol esters; polyester plasticizers obtained from dibasic acids (e.g., sebacic acid, adipic acid, azelaic acid, phthalic acid) and divalent alcohols (e.g., ethylene glycol, diethylene glycol, triethylene glycol, propylene glycol, dipropylene glycol); polyethers such as polyether polyols (e.g., polyethylene glycol, polypropylene glycol, and polytetramethylene glycol which have a molecular weight of 500 or higher, or even a molecular weight of 1000 or higher) and derivatives thereof obtained by replacing the hydroxy groups of these polyether polyols with ester groups, ether groups or other groups; polystyrenes such as polystyrene and poly-α-methylstyrene; polybutadiene; polybutene; polyisobutylene; polybutadiene-acrylonitrile; and polychloroprene.

Among these polymer plasticizers, ones compatible with the polymer as the component (A) are preferred. In this respect, polyethers and vinyl polymers are preferred. Use of polyethers as plasticizers is preferred because the surface curability and depth curability are then improved and curing retardation will not occur after storage. Among these, polypropylene glycol is more preferred. In terms of compatibility, weather resistance, and heat resistance, vinyl polymers are preferred. Among vinyl polymers, acrylic polymers and/or methacrylic polymers are preferred, and acrylic polymers such as polyalkyl acrylate esters are more preferred. The polymers may preferably be synthesized by living radical polymerization, and more preferably atom transfer radical polymerization because these methods allow production of polymers having a narrow molecular weight distribution and low viscosity. Also preferred are polymers produced by the so-called SGC process in which alkyl acrylate ester monomers are continuously bulk-polymerized under high-temperature and high-pressure conditions, as disclosed in JP-A 2001-207157.

The number average molecular weight of the polymer plasticizer is preferably 500 to 15,000, more preferably 800 to 10,000, still more preferably 1,000 to 8,000, particularly preferably 1,000 to 5,000, and most preferably 1,000 to 3,000. If the molecular weight is too low, the plasticizer exudes due to heat or rain over time, and therefore the initial physical properties cannot be maintained for a long period of time and the alkyd coating properties cannot be improved. If the molecular weight is too high, the viscosity becomes high and the workability is deteriorated. The molecular weight distribution of the polymer plasticizer is not particularly limited but is preferably narrow; the molecular weight distribution is preferably less than 1.80, more preferably 1.70 or less, still more preferably 1.60 or less, even more preferably 1.50 or less, particularly preferably 1.40 or less, and most preferably 1.30 or less.

The number average molecular weight is measured by the GPC method in the case of a vinyl polymer, and is measured by terminal group analysis in the case of a polyether polymer. Also, the molecular weight distribution (Mw/Mn) is measured by the GPC method (polystyrene equivalent basis).

The polymer plasticizer may or may not contain a reactive silyl group. If the polymer plasticizer contains a reactive silyl group, the polymer plasticizer functions as a reactive plasticizer, so that transfer of the plasticizer from the cured product can be prevented. If the polymer plasticizer contains a reactive silyl group, the number of reactive silyl groups is preferably 1 or less, and more preferably 0.8 or less per molecule on average. If a reactive silyl group-containing plasticizer, particularly a reactive silyl group-containing oxyalkylene polymer, is used, the number average molecular weight thereof needs to be lower than that of the polymer as the component (A).

One plasticizer may be used alone, or two or more plasticizers may be used in combination. Also, a low-molecular-weight plasticizer and a polymer plasticizer may be used in combination. The plasticizer may also be added at the time of polymer production.

The amount of the plasticizer is 5 to 150 parts by weight, preferably 10 to 120 parts by weight, and more preferably 20 to 100 parts by weight, for each 100 parts by weight of the polymer as the component (A). If the amount is less than 5 parts by weight, the effects of the plasticizer cannot be obtained. If the amount is more than 150 parts by weight, the mechanical strength of the cured product is insufficient.

<Silanol-containing Compound>

The curable composition of the present invention may optionally contain a compound that generates a compound containing a monovalent silanol group in the molecule by hydrolysis. Such a compound serves to decrease the modulus of the cured product without deteriorating the stickiness of the surface of the cured product. Particularly preferred are compounds generating trimethylsilanol. Examples of the compound that generates a compound containing a monovalent silanol group in the molecule by hydrolysis include compounds disclosed in JP-A H05-117521. The examples also include compounds that are derivatives of alkyl alcohols such as hexanol, octanol, and decanol, and generate a silicon compound generating $R_3SiOH$ such as trimethylsilanol by hydrolysis; and compounds disclosed in JP-A H11-241029 which are derivatives of polyalcohols containing three or more hydroxy groups per molecule such as trimethylolpropane, glycerol, pentaerythritol, and sorbitol, and generate a silicon compound generating $R_3SiOH$ such as trimethylsilanol by hydrolysis.

The examples further include compounds as disclosed in JP-A H07-258534 which are derivatives of oxypropylene polymers, and generate a silicon compound generating $R_3SiOH$ such as trimethylsilanol by hydrolysis; and polymers disclosed in JP-A H06-279693 which contain a hydrolyzable silyl group that can be cross-linked and a silyl group that can give a monosilanol-containing compound by hydrolysis.

The amount of the compound that generates a compound containing a monovalent silanol group in the molecule by hydrolysis is 0.1 to 20 parts by weight, and preferably 0.5 to 10 parts by weight, for each 100 parts by weight of the reactive silyl group-containing organic polymer (A).

<Thixotropy-imparting Agent>

The curable composition of the present invention may optionally contain a thixotropy-imparting agent (anti-sagging agent) to prevent sagging and improve the workability. Examples of the anti-sagging agent include, but not particularly limited to, polyamide waxes, hydrogenated castor oil derivatives, and metal soaps such as calcium stearate, aluminum stearate, and barium stearate. Use of powdery rubber having a particle size of 10 to 500 m as disclosed in JP-A H11-349916 or organic fibers as disclosed in JP-A 2003-155389 enables to obtain a composition that is highly thixotropic and has good workability. One of these thixotropy-imparting agents (anti-sagging agents) may be used alone, or two or more of these may be used in combination. The amount of the thixotropy-imparting agent is in the range of 0.1 to 20 parts by weight for each 100 parts by weight of the reactive silyl group-containing organic polymer (A).

The composition of the present invention may contain a compound containing an epoxy group in each molecule. Such an epoxy group-containing compound enhances the recovery of the cured product. Examples of the epoxy group-containing compound include epoxidized unsaturated fats and oils, epoxidized unsaturated fatty acid esters, alicyclic epoxy compounds, epichlorohydrin derivatives and other compounds, and mixtures thereof. Specific examples thereof include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. Among these, E-PS is particularly preferred. The amount of the epoxy compound is preferably in the range of 0.5 to 50 parts by weight for each 100 parts by weight of the reactive silyl group-containing organic polymer (A).

<Photo-curable Substance>

The composition of the present invention may contain a photo-curable substance. Use of a photo-curable substance results in the formation of a layer of the photo-curable substance on the surface of the cured product obtained, thereby improving the properties of the cured product in terms of stickiness and weather resistance. The photo-curable substance is a substance that undergoes chemical changes in the molecular structure in a considerably short period of time by action of light, and thereby causes changes in the physical properties such as curing. Such substances include known compounds such as organic monomers, oligomers, resins, and compositions containing any of them, and any commercially available ones may be used. Typical usable examples include unsaturated acrylic compounds, polyvinyl cinnamates, and azidized resins. Examples of the unsaturated acrylic compounds include monomers, oligomers, and mixtures thereof which contain a single or multiple acrylic or methacrylic unsaturated groups; specifically, monomers such as propylene (or butylene or ethylene) glycol di(meth)acrylate, and neopentyl glycol di(meth)acrylate, or oligoesters thereof with a molecular weight of 10,000 or lower. More specific examples thereof include such special acrylates as (bifunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325; and (polyfunctional) Aronix M-400 (all Aronix products available from Toagosei Co., Ltd.). Among these, acrylic functional group-containing compounds are preferred, and compounds containing, on average, 3 or more acrylic functional groups in each molecule are preferred.

Examples of the polyvinyl cinnamates include photosensitive resins containing cinnamoyl groups as photosensitive groups; specifically, ones resulting from esterification of polyvinyl alcohol with cinnamic acid, and many derivatives of polyvinyl cinnamate. The azidized resins are known as photosensitive resins with azide groups functioning as photosensitive groups, and include photosensitive rubber solutions typically containing a diazide compound as a photosensitizer. Detailed examples of the resins are also described in "Kankosei Jushi (Photosensitive Resins)" (published on Mar. 17, 1972 by Insatsu Gakkai Shuppanbu Ltd., p. 93 ff., p. 106 ff., and p. 117 ff.). Each of the photosensitive resins may be used alone, or two or more of these may be used in admixture, optionally along with a sensitizer. In some cases, addition of a sensitizer (e.g. ketones, nitro compounds) or a promoter (e.g. amines) enhances the effect. The amount of the photo-curable substance is preferably 0.1 to 20 parts by weight, and more preferably 0.5 to 10 parts by weight, for each 100 parts by weight of the reactive silyl group-containing organic polymer (A). An amount less than 0.1 parts by weight is unlikely to provide the effect of enhancing the weather resistance, while an amount more than 20 parts by weight is likely to lead to too hard a cured product which tends to undergo cracking.

<Oxygen-curable Substance>

The composition of the present invention may contain an oxygen-curable substance. Examples of the oxygen-curable substance include unsaturated compounds that can react with oxygen in the air, and these compounds serve, for example, to prevent the sticky surface of the cured product and adhesion of dirt or dust to the surface by reacting with oxygen in the air to form a cured layer around the surface of the cured product. Specific examples of the oxygen-curable substance include drying oils such as tung oil and linseed oil, and various alkyd resins produced by modification of such compounds; drying oil-modified acrylic polymers, epoxy resins, and silicone resins; liquid polymers such as 1,2-polybutadiene, 1,4-polybutadiene, and C5-C8 diene polymers, which are obtainable by polymerizing or copolymerizing diene compounds such as butadiene, chloroprene, isoprene, and 1,3-pentadiene; liquid copolymers such as NBR and SBR, which are obtainable by copolymerizing such a diene compound and a monomer copolymerizable therewith (e.g. acrylonitrile, styrene) such that the diene compound serves as the main component; and various modified products thereof (e.g. maleic-acid-modified products, boiled-oil-modified products). Each of these may be used alone, or two or more of these may be used in combination. Among these, tung oil and liquid diene polymers are particularly preferred. The combined use with a catalyst or metal dryer for promoting the oxidative curing reaction may enhance the effect. Examples of the catalyst and metal dryer include metal salts such as cobalt naphthenate, lead naphthenate, zirconium naphthenate, cobalt octylate, and zirconium octylate, and amine compounds. The amount of the oxygen-curable substance is preferably 0.1 to 20 parts by weight, and more preferably 0.5 to 10 parts by weight, for each 100 parts by weight of the reactive silyl group-containing organic polymer (A). An amount less than 0.1 parts by weight is likely to result in insufficient improvement of stain resistance, while an amount more than 20 parts by weight tends to deteriorate the tensile properties of the cured product. As described in JP-A H03-160053, the oxygen-curable substance is preferably used in combination with a photo-curable substance.

<Antioxidant>

The composition of the present invention may contain an antioxidant (age resistor). Use of an antioxidant enhances the heat resistance of the cured product to be provided. Examples of the antioxidant include hindered phenol antioxidants, monophenol antioxidants, bisphenol antioxidants, and polyphenol antioxidants. Particularly preferred are hindered phenol antioxidants. Similarly, the following hindered amine light stabilizers can be used: Tinuvin 622LD, Tinuvin 144, CHIMASSORB 944LD, and CHIMASSORB 119FL (all are products of Ciba Specialty Chemicals); MARK LA-57, MARK LA-62, MARK LA-67, MARK LA-63, and MARK LA-68 (all are products of Asahi Denka Co., Ltd.); and SANOL LS-770, SANOL LS-765, SANOL LS-292, SANOL LS-2626, SANOL LS-1114, and SANOL LS-744 (all are products of Sankyo Lifetech Co., Ltd.). Specific examples of the antioxidant also include ones disclosed in JP-A H04-283259 and JP-A H09-194731. The amount of the antioxidant is preferably 0.1 to 10 parts by weight, and more preferably 0.2 to 5 parts by weight, for each 100 parts by weight of the reactive silyl group-containing organic polymer (A).

<Light Stabilizer>

The curable composition of the present invention may contain a light stabilizer. Use of a light stabilizer enables to prevent photooxidative degradation of the cured product. Examples of the light stabilizer include benzotriazole compounds, hindered amine compounds, and benzoate compounds. Particularly preferred are hindered amine compounds. The amount of the light stabilizer is preferably 0.1 to 10 parts by weight, and more preferably 0.2 to 5 parts by weight, for each 100 parts by weight of the reactive silyl group-containing organic polymer (A). Specific examples of the light stabilizer include those disclosed in JP-A H09-194731.

In the case that the curable composition of the present invention also contains a photo-curable substance, particularly an unsaturated acrylic compound, then a tertiary amine-containing hindered amine light stabilizer is preferably used as the hindered amine light stabilizer in terms of improving the storage stability of the composition, as taught in JP-A H05-70531. Examples of the tertiary amine-containing hindered amine light stabilizer include Tinuvin 622LD, Tinuvin 144, and CHIMASSORB 119FL (all are products of Ciba Specialty Chemicals); MARK LA-57, LA-62, LA-67, and LA-63 (all are products of Asahi Denka Co., Ltd.); and SANOL LS-765, LS-292, LS-2626, LS-1114, and LS-744 (all are products of Sankyo Lifetech Co., Ltd.).

<Ultraviolet Absorber>

The composition of the present invention may contain an ultraviolet absorber. Use of an ultraviolet absorber enables to increase the surface weather resistance of the cured product. Examples of the ultraviolet absorber include benzophenone compounds, benzotriazole compounds, salicylate compounds, substituted tolyl compounds, and metal chelate compounds. Particularly preferred are benzotriazole compounds. The amount of the ultraviolet absorber is preferably 0.1 to 10 parts by weight, and more preferably 0.2 to 5 parts by weight, for each 100 parts by weight of the reactive silyl group-containing organic polymer (A). It is preferable to use a phenol or hindered phenol antioxidant, a hindered amine light stabilizer, and a benzotriazole ultraviolet absorber in combination.

<Epoxy Resin>

The composition of the present invention may contain an epoxy resin. Such curable compositions containing an epoxy resin can be particularly suitably used as adhesives, especially adhesives for exterior wall tiles. Examples of the epoxy resin include epichlorohydrin-bisphenol A epoxy resins, epichlorohydrin-bisphenol F epoxy resins, flame retardant epoxy resins such as glycidyl ethers of tetrabromobisphenol A, novolak epoxy resins, hydrogenated bisphenol A epoxy resins, epoxy resins of glycidyl ethers of bisphenol A-propylene oxide adducts, p-oxybenzoic acid glycidyl ether ester epoxy resins, m-aminophenol epoxy resins, diaminodiphenylmethane epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ethers, glycidyl ethers of polyalcohols such as glycerol, hydantoin epoxy resins, and epoxidized products of unsaturated polymers such as petroleum resins. The epoxy resin is not limited to these examples, and generally used epoxy resins may be used. Epoxy resins containing at least two epoxy groups per molecule are preferred because they are highly reactive at the time of curing and enable the cured product to easily have a three-dimensional network structure. More preferred are bisphenol A epoxy resins, novolak epoxy resins and the like. The mixing ratio of the reactive silyl group-containing organic polymer (A) to the epoxy resin by weight is polymer (A)/epoxy resin=100/1 to 1/100. If the ratio of polymer (A)/epoxy resin is less than 1/100, the impact strength and toughness of the cured product of epoxy resin are less likely to be improved. If the ratio of polymer (A)/epoxy resin is more than 100/1, the strength of the cured product of organic polymer is insufficient. The preferred mixing ratio depends on factors such as applications of the curable composition, and therefore cannot be flatly specified. For example, in order to improve the properties such as impact resistance, flexibility, toughness, and peeling strength of the cured product of epoxy resin, the amount of the component (A) is preferably 1 to 100 parts by weight, and more preferably 5 to 100 parts by weight, for each 100 parts by weight of the epoxy resin. In order to improve the strength of the cured product of the component (A), the amount of the epoxy resin is preferably 1 to 200 parts by weight, and more preferably 5 to 100 parts by weight, for each 100 parts by weight of the component (A).

<Curing Agent for Epoxy Resin>

In the case that the curable composition of the present invention contains the epoxy resin, the curable composition can of course further contain a curing agent for the epoxy resin. The epoxy resin curing agent to be used is not particularly limited, and any generally used epoxy resin curing agent can be used. Specific examples thereof include, but not limited to, primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyethers; tertiary amines such as 2,4,6-tris(dimethylaminomethyl)phenol, and tripropylamine, and salts of these tertiary amines; polyamide resins; imidazoles; dicyandiamides; boron trifluoride complex compounds; carboxylic anhydrides such as phthalic anhydride, hexahydrophthalic anhydride, tetrahydrophthalic anhydride, dodecenyl succinic anhydride, pyromellitic dianhydride, and chlorendic anhydride; alcohols; phenols; carboxylic acids; and diketone complex compounds of aluminum or zirconium. Each of these curing agents may be used alone, or two or more of these may be used in combination.

If the curing agent for the epoxy resin is used, the amount thereof is 0.1 to 300 parts by weight for each 100 parts by weight of the epoxy resin.

The curing agent for the epoxy resin may be a ketimine. Ketimines are stable in the absence of moisture, and are decomposed into a primary amine and a ketone by moisture. The produced primary amine functions as a curing agent for curing the epoxy resin at room temperature. Use of a ketimine can contribute to production of a one-pack composition. Such a ketimine can be obtained by condensation reaction between an amine compound and a carbonyl compound.

Synthesis of the ketimine may be carried out using a known amine compound and a known carbonyl compound. Examples of the amine compound include diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, and p,p'-biphenylenediamine; polyamines such as 1,2,3-triaminopropane, triaminobenzene, tris(2-aminoethyl)amine, and tetrakis(aminomethyl)methane; polyalkylene polyamines such as diethylenetriamine, triethylenetriamine, and tetraethylenepentamine; polyoxyalkylene polyamines; aminosilanes such as γ-aminopropyltriethoxysilane, N-(β-aminoethyl)-γ-aminopropyltrimethoxysilane, and N-(β-aminoethyl)-γ-aminopropylmethyldimethoxysilane. Examples of the carbonyl compound include aldehydes such as acetaldehyde, propionaldehyde, n-butylaldehyde, isobutylaldehyde, diethylacetaldehyde, glyoxal, and benzaldehyde; cyclic ketones such as cyclopentanone, trimethylcyclopentanone, cyclohexanone, and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone; and β-dicarbonyl compounds such as acetylacetone, methyl acetoacetate, ethyl acetoacetate, dimethyl malonate, diethyl malonate, methyl ethyl malonate, and dibenzoylmethane.

In the case where an imino group exists in the ketimine, the imino group may be reacted with a compound including styrene oxide; glycidyl ethers such as butyl glycidyl ether and allyl glycidyl ether; and glycidyl esters. Each of these ketimines may be used alone or two or more of these may be used in combination. The amount of the ketimine is 1 to 100 parts by weight for each 100 parts by weight of the epoxy resin, although it depends on the types of the epoxy resin and ketimine.

<Flame Retardant>

The curable composition of the present invention may contain a flame retardant such as phosphorus-based plasticizers such as ammonium polyphosphate and tricresyl phosphate, aluminum hydroxide, magnesium hydroxide, and thermoexpandable graphite. Each of the flame retardants may be used alone, or two or more of these may be used in combination.

The amount of the flame retardant is 5 to 200 parts by weight, and preferably 10 to 100 parts by weight, for each 100 parts by weight of the component (A).

<Solvent>

The composition of the present invention may contain a solvent in order to reduce the viscosity of the composition, increase the thixotropy, and improve the workability. The solvent is not particularly limited, and various compounds can be used. Specific examples thereof include hydrocarbon solvents such as toluene, xylene, heptane, hexane, and petroleum solvents; halogenated solvents such as trichloroethylene; ester solvents such as ethyl acetate and butyl acetate; ketone solvents such as acetone, methyl ethyl ketone, and methyl isobutyl ketone; ether solvents; alcohol solvents such as methanol, ethanol, and isopropanol; and silicone solvents such as hexamethylcyclotrisiloxane, octamethylcyclotetrasiloxane, and decamethylcyclopentasiloxane. In the case of using a solvent, the boiling point of the solvent is preferably 150° C. or higher, more preferably 200° C. or higher, and particularly preferably 250° C. or higher in terms of the problem of air contamination in the indoor use of the composition. Each of these solvents may be used alone, or two or more of these may be used in combination.

In the case that the amount of the solvent added is large, however, the toxicity to human bodies may be high, and the volume of the cured product may shrink, for instance. Therefore, the amount of the solvent is preferably 3 parts by weight or less, more preferably 1 part by weight or less, and most preferably substantially zero, for each 100 parts by weight of the organic polymer (A).

<Other Various Additives>

The curable composition of the present invention may optionally contain various additives for adjustment of physical properties of the curable composition or cured product. Examples of the additives include curability modifiers, radical inhibitors, metal deactivators, antiozonants, phosphorus-containing peroxide decomposers, lubricants, pigments, blowing agents, repellents for ants, and antifungal agents. Each of these various additives may be used alone, or two or more of these may be used in combination. Specific examples of the additives other than the ones mentioned herein are described in, for example, JP-B H04-69659, JP-B H07-108928, JP-A S63-254149, JP-A S64-22904, and JP-A 2001-72854.

<Preparation Method of Curable Composition>

The curable composition of the present invention can be prepared as a one-pack curable composition which is prepared by compounding all the formulation components and storing the resulting composition in a hermetically closed vessel in advance, and after application, is curable by moisture in the air. Also, the curable composition can be prepared as a two-pack curable composition which separately includes components to be mixed with each other prior to application, namely a polymer composition and a mixture (as curing agent) prepared by mixing components including a curing catalyst, filler, plasticizer, and water. In terms of workability, a one-pack curable composition is preferred.

In the case of preparing a one-pack curable composition, since all the formulation components are mixed in advance, formulation components containing water are preferably dehydrated and dried prior to application, or are dehydrated, for example, under reduced pressure during the mixing and kneading. In the case of preparing a two-pack curable composition, since a curing catalyst is not required to be mixed in the base mixture including the reactive silyl group-containing organic polymer, the base mixture is less likely to be gelled even if a small amount of water is left; still, if long-term storage stability is required, the formulation components are preferably dehydrated and dried. Preferred examples of the dehydrating and drying method include heat drying in the case that the formulation components are solids such as powder; and vacuum dehydration and dehydration using a substance such as synthetic zeolite, active alumina, silica gel, quick lime, and magnesium oxide in the case that the formulation components are liquids. Also, the composition may be mixed with a small amount of an isocyanato compound so that the isocyanato group and water are reacted for dehydration. The composition may also be mixed with an oxazolidine compound such as 3-ethyl-2-methyl-2-(3-methylbutyl)-1,3-oxazolidine so that the compound is reacted with water for dehydration. The storage stability can be further improved by, in addition to performing the dehydrating and drying method mentioned above, adding a lower alcohol such as methanol and ethanol; or an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane.

The amount of the dehydrating agent, particularly a silicon compound reactive with water, such as vinyltrimethoxysilane, is preferably 0.1 to 20 parts by weight, and more preferably 0.5 to 10 parts by weight, for each 100 parts by weight of the reactive silyl group-containing organic polymer (A).

The curable composition of the present invention may be prepared by any methods including commonly used methods. Examples thereof include a method in which the aforementioned components are mixed and kneaded at room temperature or under heating by a mixer, roller, kneader, or the like; and a method in which the components are dissolved in a small amount of an appropriate solvent and then mixed.

When exposed to the air, the curable composition of the present invention forms a three-dimensional network structure by the action of moisture, so as to be cured into a rubbery, elastic solid.

<Application>

The curable composition of the present invention may be used in applications such as pressure-sensitive adhesives; sealing materials for buildings, ships, automobiles, roads, and the like; adhesives; impression materials; vibration-proof materials; damping materials; soundproof materials; expanded/foamed materials; coating compositions; and spray coatings. The cured product obtained by curing the curable composition of the present invention is excellent in flexibility and adhesion properties, and thus the curable composition is more preferably used in such applications as sealing materials and adhesives. The curable composition of the present invention may also be used in various applications such as electric and electronic part materials (e.g. solar cell backside sealants); electrical insulating materials (e.g. insulating coating materials for electric wires and cables); elastic adhesives; contact adhesives; spray sealants; crack repair materials; tiling adhesives; powder coating compositions; casting materials; rubber materials for medical use; pressure-sensitive adhesives for medical use; sealing materials for medical devices; food packaging materials; joint sealing materials for siding boards and other exterior materials; coating materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated-glass edges (cut end faces); and liquid sealants for use in automotive parts, electrical machinery parts, various machinery parts, and the like. Further, the curable composition may also be used as various sealing compositions and adhesive compositions because it, either alone or with the aid of a primer, may adhere to a wide range of substrates such as glass, ceramics, wood, metals, and resin moldings. In addition, the curable composition of the present invention may also be used as adhesives for interior panels, adhesives for exterior panels, tiling adhesives, stone pitching adhesives, ceiling finishing adhesives, floor finishing adhesives, wall finishing adhesives, vehicle panel adhesives, adhesives for electric/electronic/precision device assembling, direct glazing sealants, double glazing sealants, sealing materials for SSG systems, and sealing materials for working joints in buildings. In particular, since the curable composition of the present invention is excellent in water-resistant adhesion, the curable composition is useful as adhesives and sealing materials for porous adherends (e.g., various wood, concrete, slate, mortar materials) and double glazing sealants.

EXAMPLES

The following specific examples illustrate the present invention in more detail. They are, however, by no means limitative of the scope of the invention.

Synthesis Example 1

Propylene oxide was polymerized in the presence of polyoxypropylene triol having a molecular weight of about 3,000 as an initiator and a zinc hexacyanocobaltate glyme complex catalyst to provide a polypropylene oxide having a number average molecular weight of about 26,000 (polystyrene-equivalent molecular weight determined with a TOSOH model HLC-8120 GPC solvent delivery system, a TOSOH model TSK-GEL H type column, and THF as a solvent). To this hydroxy group-terminated polypropylene oxide was then added a methanol solution of NaOMe in an amount of 1.2 equivalents to the hydroxy groups of the polypropylene oxide, and the methanol was distilled off. Allyl chloride was then added to the residue, and thereby the terminal hydroxy group was converted to an allyl group. As a result, an allyl group-terminated polypropylene oxide having a number average molecular weight of about 26,000 was obtained.

The resulting unpurified allyl group-terminated polypropylene oxide (100 parts by weight) was mixed with n-hexane (300 parts by weight) and water (300 parts by weight) under stirring, and then the water was removed by centrifugation. The resulting hexane solution was further mixed with water (300 parts by weight) under stirring, and the water was removed again by centrifugation. Thereafter, the hexane was removed by evaporation under reduced pressure. Thereby, the purified allyl group-terminated polypropylene oxide (also referred to as "polymer P") was obtained. In the presence of 150 ppm of an isopropanol solution of a platinum-vinylsiloxane complex having a platinum content of 3 wt % as a catalyst, the obtained polymer P (100 parts by weight) was reacted with methyldimethoxysilane (1.1 parts by weight) at 90° C. for five hours to provide a methyldimethoxysilyl group-terminated polypropylene oxide (A-1). As a result of 1H-NMR measurement (measured in a $CDCl_3$ solvent with JNM-LA400 produced by JEOL Ltd.), the average number of terminal methyldimethoxysilyl groups per molecule was found to be about 1.9.

Synthesis Example 2

A 200-ml flask with a stirrer was charged with 46.3 g (0.1 mol) of dioctyltin diacetate (product name: NEOSTANN U-820, product of Nitto Kasei Co., Ltd.) and 41.7 g (0.2 mol) of tetraethoxysilane, and the by-product, ethyl acetate, was distilled off while the compounds were reacted for three hours at 120° C. Then, the volatile matter was further distilled off under reduced pressure, and the target compound $(C_8H_{17})_2Sn[OSi(OC_2H_5)_3]_2$ (B-1) was obtained.

Example 1

The reactive silyl group-containing organic polymer, filler, plasticizer, thixotropy-imparting agent, various stabilizers, dehydrating agent, adhesion-imparting agent, curing catalyst, and the like were weighed in accordance with the formulation shown in Table 1, and were mixed and kneaded by a mixer under dehydration conditions with substantially no water. Thereafter, the mixture was hermetically packed in a moisture-proof container (aluminum cartridge). Thus, a one-pack curable composition was prepared. Before use, each of the one-pack compositions in Table 1 was squeezed out of each cartridge, and the following evaluations were performed.

The following various additives were used.
<plasticizer> PPG3000 (polypropylene glycol, diol type, with a molecular weight of 3000)
<Filler> Hakuenka CCR (product of Shiraishi Kogyo Kaisha, Ltd., colloidal calcium carbonate), TIPAQUE R-820 (product of Ishihara Sangyo Kaisha Ltd., titanium oxide)
<Thixotropy-imparting agent> DISPARLON 6500 (product of Kusumoto Chemicals, Ltd., amide wax thixotropy-imparting agent)
<Ultraviolet absorber> Tinuvin 326 (product of Ciba Specialty Chemicals)
<Light stabilizer> Tinuvin 770 (product of Ciba Specialty Chemicals)
<Adhesion-imparting agent> A-1120 (product of Momentive Performance Materials Inc., N-(β-aminoethyl)-γ-aminopropyltrimethoxysilane), A-1110 (product of Momentive Performance Materials Inc., γ-aminopropyltrimethoxysilane)
<Dehydrating agent> A-171 (product of Momentive Performance Materials Inc., vinyltrimethoxysilane)
(Curability Test)
Each curable composition was squeezed out of the cartridge and charged into a mold having a thickness of about 5 mm with a spatula, and the surface of the charged composition was flattened. The time point at which the surface of the charged composition was flattened was defined as the start time of curing. The surface of the composition was touched by a spatula from time to time, and the time period required for the composition to no longer stick to the spatula (regarded as skinning time) was determined. The skinning time was measured under conditions of 23° C. and 50% RH. Table 1 shows the results.
(Cured Product Tensile Test)
Each curable composition was poured from the cartridge into a polyethylene mold carefully so that no air bubble was trapped. The poured composition was cured at 23° C. for 3 days and then at 50° C. for 4 days to give a cured sheet having a thickness of 3 mm. No. 3 dumbbell-shaped specimens were punched out from the cured sheet and subjected to a tensile test at 23° C. and at 50% RH (tensile rate: 200 mm/min) to determine the modulus at 50% elongation (M50), tensile strength at break (Tb), and elongation at break (Eb). Table 1 shows the results.

TABLE 1

| Formulation (Parts by weight) | | Example 1 |
|---|---|---|
| Reactive silyl group-containing organic polymer | A-1 | 100 |
| Plasticizer | PPG3000 | 55 |
| Filler | CCR | 120 |
| | R-820 | 20 |
| Thixotropy-imparting agent | DISPARLON 6500 | 2 |
| Ultraviolet absorber | Tinuvin 326 | 1 |
| Light stabilizer | Tinuvin 770 | 1 |
| Adhesion-imparting agent | A-1120 | 1.5 |
| | A-1110 | 1.5 |
| Dehydrating agent | A-171 | 2 |
| Silanol condensation catalyst | B-1 | 3 |
| Curability | Skinning time, min | 19 |
| Modulus at 50% elongation | M50, MPa | 0.45 |
| Tensile strength at break | Tb, MPa | 2.13 |
| Elongation at break | Eb, % | 485 |

The curable composition of Example 1 exhibited favorable curability and favorable physical properties of the cured product.

Synthesis Example 3

Propylene oxide was polymerized in the presence of polyoxypropylene glycol having a molecular weight of about 2,000 as an initiator and a zinc hexacyanocobaltate glyme complex catalyst to provide a polypropylene oxide having a number average molecular weight of about 30,000 (polystyrene-equivalent molecular weight determined with a TOSOH model HLC-8120 GPC solvent delivery system, a TOSOH model TSK-GEL H type column, and THF as a solvent). To this hydroxy group-terminated polypropylene oxide was then added a methanol solution of NaOMe in an amount of 1.2 equivalents to the hydroxy groups of the polypropylene oxide, and the methanol was distilled off. Allyl chloride was then added to the residue, and thereby the terminal hydroxy group was converted to an allyl group. As a result, an allyl group-terminated polypropylene oxide having a number average molecular weight of about 30,000 was obtained.

The resulting unpurified allyl group-terminated polypropylene oxide (100 parts by weight) was mixed with n-hexane (300 parts by weight) and water (300 parts by weight) under stirring, and then the water was removed by centrifugation. The resulting hexane solution was further mixed with water (300 parts by weight) under stirring, and the water was removed again by centrifugation. Thereafter, the hexane was removed by evaporation under reduced pressure. Thereby, the purified allyl group-terminated polypropylene oxide (also referred to as "polymer Q") was obtained. In the presence of 150 ppm of an isopropanol solution of a platinum-vinylsiloxane complex having a platinum content of 3 wt % as a catalyst, the obtained polymer Q (100 parts by weight) was reacted with methyldimethoxysilane (0.94 parts by weight) at 90° C. for five hours to provide a methyldimethoxysilyl group-terminated polypropylene oxide (A-2). As a result of 1H-NMR measurement (measured in a CDCl$_3$ solvent with JNM-LA400 produced by JEOL Ltd.), the average number of terminal methyldimethoxysilyl groups per molecule was found to be about 1.5.

Synthesis Example 4

In the presence of 150 ppm of an isopropanol solution of a platinum-vinylsiloxane complex having a platinum content of 3 wt % as a catalyst, the obtained polymer Q (100 parts by weight) was reacted with triethoxysilane (1.5 parts by weight) at 90° C. for five hours to provide a polyoxypropylene polymer (A-3) containing 1.5 terminal triethoxysilyl groups on average.

Synthesis Example 5

Propylene oxide was polymerized in the presence of polyoxypropylene diol having a molecular weight of about 2,000 as an initiator and a zinc hexacyanocobaltate glyme complex catalyst to provide a hydroxy group-terminated bifunctional polypropylene oxide having a number average molecular weight of about 25,500 (polystyrene-equivalent molecular weight determined with a TOSOH model HLC-8120 GPC solvent delivery system, a TOSOH model TSK-GEL H type column, and THF as a solvent) (this polypropylene oxide is referred to as "polymer R").

The obtained polymer R (100 parts by weight) was reacted with γ-isocyanatopropyltriethoxysilane (2.2 parts by weight) at 90° C. for five hours to provide a triethoxysilyl group-terminated polyoxypropylene polymer (A-4). As a result of 1H-NMR measurement (measured in a CDCl$_3$ solvent with JNM-LA400 produced by JEOL Ltd.), the average number of terminal triethoxysilyl groups per molecule was found to be 1.4.

Synthesis Example 6

$(C_4H_9)_2Sn[OSi(OC_2H_5)_3]_2$ (B-2) was obtained in the same manner as in Synthesis Example 2, except that dibutyltin diacetate (35.1 g (0.1 mol), product name: NEOSTANN U-200, produced by Nitto Kasei Co., Ltd.) was used in place of dioctyltin diacetate.

Synthesis Example 7

$(C_8H_{17})_2Sn[OSi(OC_4H_9)_3]_2$ (B-3) was obtained in the same manner as in Synthesis Example 2, except that tetrabutoxysilane (64.1 g (0.2 mol)) was used in place of tetraethoxysilane.

Synthesis Example 8

$(C_8H_{17})_2Sn[OSi(OCH_3)_3]_2$ (B-4) was obtained in the same manner as in Synthesis Example 2, except that tetramethoxysilane (30.4 g (0.2 mol)) was used in place of tetraethoxysilane.

Examples 2 to 10, Comparative Examples 1 to 10

The reactive silyl group-containing organic polymer, filler, plasticizer, thixotropy-imparting agent, ultraviolet absorber, and light stabilizer were weighed in accordance with the formulation shown in Table 2, and were mixed and kneaded by a mixer under dehydration conditions with substantially no water. Thereafter, the mixture was hermetically packed in a moisture-proof container (aluminum cartridge). Then, the dehydrating agent, adhesion-imparting agent, and curing catalyst were added in accordance with the formulation shown in Table 2, whereby a one-pack curable composition was prepared. The later-described evaluations were made using the one-pack curable compositions in Table 2.

The following various additives were used.

<Plasticizer> PPG3000 (polypropylene glycol, diol type, with a molecular weight of 3000)

<Filler> Hakuenka CCR (product of Shiraishi Kogyo Kaisha, Ltd., colloidal calcium carbonate), TIPAQUE R-820 (product of Ishihara Sangyo Kaisha Ltd., titanium oxide)

<Thixotropy-imparting agent> DISPARLON 6500 (product of Kusumoto Chemicals, Ltd., amide wax thixotropy-imparting agent)

<Ultraviolet absorber> Tinuvin 326 (product of Ciba Specialty Chemicals)

<Light stabilizer> Tinuvin 770 (product of Ciba Specialty Chemicals)

<Adhesion-imparting agent> A-1120 (product of Momentive Performance Materials Inc., N-(β-aminoethyl)-γ-aminopropyltrimethoxysilane), KBE-603 (product of Shin-Etsu Chemical Co., Ltd., N-(β-aminoethyl)-γ-aminopropyltriethoxysilane), KBM-602 (product of Shin-Etsu Chemical Co., Ltd., N-(β-aminoethyl)-γ-aminopropylmethyldimethoxysilane), A-Link 15 (product of Momentive Performance Materials Inc., 3-(N-ethylamino)-2-methylpropyltrimethoxysilane)

<Dehydrating agent> A-171 (product of Momentive Performance Materials Inc., vinyltrimethoxysilane), A-151 (product of Momentive Performance Materials Inc., vinyltriethoxysilane), Ethyl Silicate-28 (product of Colcoat Co., Ltd., tetraethoxysilane), A-2171 (product of Momentive Performance Materials Inc., vinylmethyldimethoxysilane)

<Curing catalyst> NEOSTANN U-820 (product of Nitto Kasei Co., Ltd., dioctyltin diacetate), NEOSTANN U-200 (product of Nitto Kasei Co., Ltd., dibutyltin diacetate), NEOSTANN U-220H (product of Nitto Kasei Co., Ltd., dibutyltin bisacetylacetonate), NEOSTANN U-810 (product of Nitto Kasei Co., Ltd., dioctyltin dilaurate)

(Recovery Ratio)

Each composition in Table 2 was cured at 23° C. for 3 days and then at 50° C. for four days to prepare a sheet having a thickness of about 3 mm. The sheet was punched out into No. 3 dumbbell specimens, and the specimens were pulled until the gage length of 20 mm reached 40 mm (i.e. 100% elongation). The specimens were fixed in this state at 23° C. for 24 hours. The specimens were then released at 23° C., and the gage length after one hour from the release was measured to calculate the ratio of the recovered gage length, which was regarded as the recovery ratio. A larger recovery ratio indicates better recovery. Table 2 shows the results.

(Curability Test)

The curability of the prepared one-pack curable compositions before storage was measured. The curability (skinning time) was evaluated by the following procedures. Each curable composition was charged into a mold having a thickness of about 5 mm with a spatula, and the surface of the charged composition was flattened. The time point at which the surface of the charged composition was flattened was defined as the start time of curing. The surface of the composition was touched by a spatula from time to time, and the time period required for the composition to no longer stick to the spatula (regarded as skinning time) was determined. The skinning time was measured under conditions of 23° C. and 50% RH. Table 2 shows the results.

(Cured Product Tensile Test)

Each curable composition was poured from the cartridge into a polyethylene mold carefully so that no air bubble was trapped. The poured composition was cured at 23° C. for 3 days and then at 50° C. for 4 days to give a cured sheet having a thickness of 3 mm. No. 3 dumbbell-shaped specimens were punched out from the cured sheet and subjected to a tensile test at 23° C. and at 50% RH (tensilerate: 200 ram/min) to determine the modulus at 50% elongation (M50), tensile strength at break (Tb), and elongation at break (Eb). Table 2 shows the results.

(Adhesion Test)

Each curable composition was squeezed out of the cartridge so as to adhere to an adherend (electrolytically colored aluminum, or polyvinyl chloride), whereby a specimen was prepared. A 90° hand peeling test for determining the adhesion was performed on the prepared specimen after the specimen was cured at 23° C. and 50% RH for 7 days (initial adhesion), and after the specimen was, subsequently to the curing at 23° C. and 50% RH for 7 days, immersed in warm water at 50° C. (water-resistant adhesion). The adhesion was evaluated as follows based on the failure modes: cohesive failure=CF; thin layer cohesive failure=TCF; and interfacial failure=AF. Table 2 shows the results.

TABLE 2

| Formulation (parts by weight) | | Example | | | | | | | | |
|---|---|---|---|---|---|---|---|---|---|---|
| | | 2 | 3 | 4 | 5 | 6 | 7 | 8 | 9 | 10 |
| Reactive silyl group-containing organic polymer | A-2 | 100 | 100 | 100 | 100 | | | | | 100 |
| | A-3 | | | | | 100 | 100 | | | |
| | A-4 | | | | | | | 100 | 100 | |
| Plasticizer | PPG3000 | 55 | 55 | 55 | 55 | 55 | 55 | 55 | 55 | 55 |
| Filler | CCR | 120 | 120 | 120 | 120 | 120 | 120 | 120 | 120 | 120 |
| | R-820 | 20 | 20 | 20 | 20 | 20 | 20 | 20 | 20 | 20 |
| Thixotropy-imparting agent | DISPARLON 6500 | 2 | 2 | 2 | 2 | 2 | 2 | 2 | 2 | 2 |
| Ultraviolet absorber | Tinuvin 326 | 1 | 1 | 1 | 1 | 1 | 1 | 1 | 1 | 1 |
| Light stabilizer | Tinuvin 770 | 1 | 1 | 1 | 1 | 1 | 1 | 1 | 1 | 1 |
| Adhesion-imparting agent | A-1120 | 3 | 3 | 3 | 3 | | | | | 3 |
| | KBE-603 | | | | | 3 | 3 | 3 | 3 | |
| | KBM-602 | | | 0.3 | | | | | | |
| | A-Link 15 | | | | | | | | | |
| Dehydrating agent | A-171 | 2 | | 2 | 2 | | | | | 2 |
| | A-151 | | | | | 2 | | 2 | | |
| | Ethyl Silicate 28 | | | | | | 2 | | 2 | |
| | A-2171 | | 0.2 | | | | | | | |

TABLE 2-continued

| | | | | | | | | | | |
|---|---|---|---|---|---|---|---|---|---|---|
| Silanol condensation catalyst | B-1 | 2 | 2 | 2 | 2 | 2 | 2 | 2 | 2 | |
| | B-2 | | | | | | | | | |
| | B-3 | | | | | | | | | |
| | B-4 | | | | | | | | | 2 |
| | NEOSTANN U-820 | | | | | | | | | |
| | NEOSTANN U-200 | | | | | | | | | |
| | NEOSTANN U-220H | | | | | | | | | |
| | NEOSTANN U-810 | | | | | | | | | |
| Curability | Skinning time, min | 50 | 18 | 43 | 40 | 230 | 125 | 140 | 80 | 42 |
| Modulus at 50% elongation | M50, MPa | 0.35 | 0.35 | 0.33 | 0.33 | 0.36 | 0.42 | 0.34 | 0.39 | 0.34 |
| Tensile strength at break | Tb, MPa | 2.58 | 2.07 | 2.15 | 2.38 | 2.18 | 1.89 | 2.08 | 1.81 | 2.24 |
| Elongation at break | Eb, % | 810 | 610 | 800 | 795 | 620 | 405 | 650 | 420 | 775 |
| Recovery | % | 65 | 70 | 60 | 60 | 85 | 90 | 85 | 90 | 60 |
| Initial adhesion | Electrolytically colored aluminum | CF | CF | CF | CF | CF | CF | CF | CF | CF |
| | Polyvinyl chloride | CF | CF | CF | CF | CF | CF | CF | CF | CF |
| Water-resistant adhesion | Electrolytically colored aluminum | CF | CF | CF | CF | CF | CF | CF | CF | TCF |
| | Polyvinyl chloride | CF | CF | CF | CF | CF | CF | CF | CF | CF |

| | | Comparative Example | | | | | | | | | |
|---|---|---|---|---|---|---|---|---|---|---|---|
| Formulation (parts by weight) | | 1 | 2 | 3 | 4 | 5 | 6 | 7 | 8 | 9 | 10 |
| Reactive silyl group-containing organic polymer | A-2 | 100 | 100 | 100 | 100 | 100 | 100 | 100 | 100 | 100 | 100 |
| | A-3 | | | | | | | | | | |
| | A-4 | | | | | | | | | | |
| Plasticizer | PPG3000 | 55 | 55 | 55 | 55 | 55 | 55 | 55 | 55 | 55 | 55 |
| Filler | CCR | 120 | 120 | 120 | 120 | 120 | 120 | 120 | 120 | 120 | 120 |
| | R-820 | 20 | 20 | 20 | 20 | 20 | 20 | 20 | 20 | 20 | 20 |
| Thixotropy-imparting agent | DISPARLON 6500 | 2 | 2 | 2 | 2 | 2 | 2 | 2 | 2 | 2 | 2 |
| Ultraviolet absorber | Tinuvin 326 | 1 | 1 | 1 | 1 | 1 | 1 | 1 | 1 | 1 | 1 |
| Light stabilizer | Tinuvin 770 | 1 | 1 | 1 | 1 | 1 | 1 | 1 | 1 | 1 | 1 |
| Adhesion-imparting agent | A-1120 | 3 | 3 | 3 | 3 | 3 | 3 | | | | |
| | KBE-603 | | | | | | | | | | |
| | KBM-602 | | | | | | | 3 | 3 | | |
| | A-Link 15 | | | | | | | | | 3 | |
| Dehydrating agent | A-171 | 2 | 2 | 2 | 2 | 2 | 2 | 2 | | 2 | 2 |
| | A-151 | | | | | | | | | | |
| | Ethyl Silicate 28 | | | | | | | | | | |
| | A-2171 | | | | | | | | 2 | | |
| Silanol condensation catalyst | B-1 | | | | | | | 2 | 2 | 2 | 2 |
| | B-2 | 2 | | | | | | | | | |
| | B-3 | | 2 | | | | | | | | |
| | B-4 | | | | | | | | | | |
| | NEOSTANN U-820 | | | 2 | | | | | | | |
| | NEOSTANN U-200 | | | | 2 | | | | | | |
| | NEOSTANN U-220H | | | | | 2 | | | | | |
| | NEOSTANN U-810 | | | | | | 2 | | | | |
| Curability | Skinning time, min | 27 | 50 | 300 | 265 | 35 | 300 or longer | 140 | 130 | 40 | 300 or longer |
| Modulus at 50% elongation | M50, MPa | 0.35 | 0.36 | 0.33 | 0.31 | 0.25 | 0.34 | 0.22 | 0.12 | 0.21 | 0.27 |
| Tensile strength at break | Tb, MPa | 2.4 | 2.22 | 2.3 | 2.5 | 2.13 | 2.51 | 1.42 | 0.7 | 1.71 | 2.35 |
| Elongation at break | Eb, % | 815 | 770 | 840 | 865 | 985 | 950 | 790 | 740 | 1085 | 870 |
| Recovery | % | 55 | 65 | 55 | 45 | 40 | 65 | 35 | 30 | 55 | 80 |
| Initial adhesion | Electrolytically colored aluminum | CF | CF | TCF | AF | AF | AF | CF | CF | AF | AF |

TABLE 2-continued

| | | | | | | | | | | | |
|---|---|---|---|---|---|---|---|---|---|---|---|
| Water-resistant adhesion | Polyvinyl chloride | CF | CF | CF | CF | CF | CF | CF | CF | CF | AF |
| | Electrolytically colored aluminum | AF | AF | AF | AF | AF | AF | AF | CF | AF | AF |
| | Polyvinyl chloride | CF | CF | CF | CF | CF | CF | CF | CF | CF | AF |

Each of the cured products of Examples 2 to 10 showed high recovery, highly practical curability, and favorable water-resistant adhesion. In contrast, the cured products of Comparative Example 1, Comparative Examples 3 to 5, and Comparative Examples 7 to 9 showed lower recovery than the cured product of Example 2. The compositions of Comparative Example 6 and Comparative Example 10 showed significantly lower curability than the cured product of Example 2. The cured products of Examples 6 to 9 showed higher recovery than those of Examples 2 to 5, and the cured products of Examples 7 and 9 showed particularly high recovery. The compositions of Comparative Examples 1 to 7 and Comparative Examples 9 and 10 showed lower water-resistant adhesion to electrolytically colored aluminum than the cured products of Examples.

As demonstrated above, the curable composition of the present invention has excellent recovery, curability and water-resistant adhesion.

INDUSTRIAL APPLICABILITY

The curable composition of the present invention may be used in applications such as pressure-sensitive adhesives; sealing materials for buildings, ships, automobiles, roads, and the like; adhesives; impression materials; vibration-proof materials; damping materials; soundproof materials; expanded/foamed materials; coating compositions; and spray coatings. Since the cured product obtained by curing the curable composition of the present invention is excellent in flexibility and adhesion properties, it is more preferable to use the curable composition as sealing materials and adhesives among these applications. The curable composition of the present invention may also be used in various applications such as electric and electronic part materials (e.g. solar cell backside sealants); electrical insulating materials such as insulating coating materials for electric wires and cables; elastic adhesives; contact adhesives; spray sealants; crack repair materials; tiling adhesives; powder coating compositions; casting materials; rubber materials for medical use; pressure-sensitive adhesives for medical use; sealing materials for medical devices; food packaging materials; joint sealing materials for siding boards and other exterior materials; coating materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated-glass edges (cut end faces); and liquid sealants for use in automotive parts, electrical machinery parts, various machinery parts, and the like. Further, the curable composition may also be used as various sealing compositions and adhesive compositions as it, either alone or with the aid of a primer, can adhere to a wide range of substrates such as glass, ceramics, wood, metals, and resin moldings. The curable composition of the present invention may also be used as adhesives for interior panels, adhesives for exterior panels, tiling adhesives, stone pitching adhesives, ceiling finishing adhesives, floor finishing adhesives, wall finishing adhesives, vehicle panel adhesives, adhesives for electric/electronic/precision device assembling, direct glazing sealants, double glazing sealants, sealing materials for SSG systems, and sealing materials for working joints in buildings. In particular, since the curable composition of the present invention is excellent in water-resistant adhesion, the curable composition is useful as adhesives and sealing materials for porous adherends (e.g., various wood, concrete, slate, mortar materials) and double glazing sealants.

The invention claimed is:

1. A curable composition comprising:
   100 parts by weight of an organic polymer (A) containing at least one silyl group that contains a hydroxy or hydrolyzable group bonded to a silicon atom and can form a siloxane bond to be cross-linked;
   0.1 to 10 parts by weight of a silanol condensation catalyst (B); and
   a silane coupling agent (C) that contains a primary amino group, the silyl group in the organic polymer (A) being a group represented by formula (5):

$$-SiR^6{}_{3-a}(OR^7)_a \qquad (5)$$

wherein $R^6$ is each independently a C1 to C20 alkyl group, a C6 to C20 aryl group, a C7 to C20 aralkyl group, or a triorganosiloxy group represented by $(R')_3SiO-$ with R' each independently being a substituted or unsubstituted C1 to C20 hydrocarbon group; $R^7$ is each independently a C1 hydrocarbon group; and a is 2,
   the silanol condensation catalyst (B) being a reaction product of a dialkyltin dicarboxylate represented by the following formula (1) and a tetraalkoxysilane represented by the following formula (2) and/or its partially hydrolyzed condensate,
   the formula (1) being $$R^1{}_2Sn(OCOR^2)_2 \qquad (1)$$

wherein $R^1$ is each independently a C5 to C17 monovalent hydrocarbon group, and $R^2$ is each independently a C1 to C17 monovalent hydrocarbon group,
   the formula (2) being $$Si(OR^3)_4 \qquad (2)$$

wherein $R^3$ is each independently a C1 or C2 hydrocarbon group,
   the silane coupling agent (C) that contains a primary amino group being an amino silane coupling agent that contains an $-NH_2$ group and a group represented by formula (3):

$$-SiR^4{}_{3-b}(OR^5)_b \qquad (3)$$

wherein $R^4$ is each independently a C1 to C20 hydrocarbon group, $R^5$ is each independently a C1 hydrocarbon group, and b is 1, 2, or 3,
   wherein $R^7$ in the component (A) and $R^5$ in the component (C) are the same groups, and
   the curable composition having a content of an amino silane coupling agent (C1) with b in formula (3) being 3 of 1 to 10 parts by weight, and having a content of an amino silane coupling agent (C2) with b in formula (3) being 1 or 2 of less than 1 part by weight.

2. The curable composition according to claim 1, wherein the silanol condensation catalyst (B) is a dialkyltin disilicate compound represented by formula (4):

$$R^1{}_2Sn\{OSi(OR^3)_3\}_2 \qquad (4)$$

wherein $R^1$ is each independently a C5 to C17 monovalent hydrocarbon group, and $R^3$ is each independently a C1 or C2 hydrocarbon group.

3. The curable composition according to claim 1 or 2, wherein the organic polymer (A) has a main chain skeleton of a polyoxyalkylene polymer and/or a poly(meth)acrylate ester polymer.

4. The curable composition according to claim 3, wherein the organic polymer (A) has a main chain skeleton of a polyoxypropylene polymer.

5. The curable composition according to claim 1, wherein the silanol condensation catalyst (B) is
a reaction product obtained by reacting 1 mole of the dialkyltin dicarboxylate represented by formula (1) and 2 to 6 moles of the tetraalkoxysilane represented by formula (2) and/or its partially hydrolyzed condensate, or
a mixture of the reaction product and the tetraalkoxysilane represented by formula (2) and/or its partially hydrolyzed condensate.

6. The curable composition according to claim 1, further comprising a silicon compound (D) represented by formula (6):

$$R^8{}_{4-c}Si(OR^9)_c \qquad (6)$$

wherein $R^8$ is each independently an unsubstituted C1 to C20 hydrocarbon group or a substituted C1 to C20 hydrocarbon group with a substituent other than an amino group, $R^9$ is each independently a C1 or C2 hydrocarbon group, and c is 1, 2, 3, or 4, and
the curable composition having a content of a silicon compound (D1) with c in formula (6) being 3 or 4 of 1 to 10 parts by weight, and having a content of a silicon compound (D2) with c in formula (6) being 1 or 2 of less than 1 part by weight.

7. The curable composition according to claim 6, wherein $R^7$ in the component (A), $R^5$ in the component (C), and $R^9$ in the component (D) are the same groups.

8. The curable composition according to claim 1, which is a one-pack curable composition.

9. The curable composition according to claim 1, further comprising colloidal calcium carbonate.

10. The curable composition according to claim 9, comprising 1 to 300 parts by weight of the colloidal calcium carbonate for each 100 parts by weight of the component (A).

11. The curable composition according to claim 1, comprising not more than 180 parts by weight of heavy calcium carbonate for each 100 parts by weight of the component (A).

* * * * *